United States Patent
Parhi

(10) Patent No.: US 7,239,652 B2
(45) Date of Patent: Jul. 3, 2007

(54) PIPELINING OF MULTIPLEXER LOOPS IN A DIGITAL CIRCUIT

(75) Inventor: Keshab K Parhi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1044 days.

(21) Appl. No.: 10/055,910

(22) Filed: Jan. 28, 2002

(65) Prior Publication Data

US 2003/0142697 A1    Jul. 31, 2003

(51) Int. Cl.
*H04J 3/04* (2006.01)
*H03H 7/30* (2006.01)
*G06F 17/10* (2006.01)

(52) U.S. Cl. ............ 370/535; 375/233; 708/323; 708/301

(58) Field of Classification Search ............ None
See application file for complete search history.

(56) References Cited

U.S. PATENT DOCUMENTS

| | | | | |
|---|---|---|---|---|
| 6,192,072 | B1 * | 2/2001 | Azadet et al. | 375/233 |
| 6,363,112 | B1 * | 3/2002 | Azadet et al. | 375/233 |
| 2001/0035994 | A1 * | 11/2001 | Agazzi et al. | 359/152 |
| 2002/0021767 | A1 * | 2/2002 | Greiss et al. | 375/316 |
| 2002/0181575 | A1 * | 12/2002 | Birru | 375/233 |
| 2003/0142698 | A1 | 7/2003 | Parhi | |

FOREIGN PATENT DOCUMENTS

EP    1 058 431 A2    12/2000

OTHER PUBLICATIONS

Parhi, Keshab K. et al., "Pipeline Interleaving and Parallelism in Recursive Digital Filter—Part I: Pipelining Using Scattered Look-Ahead and Decomposition," *IEEE Transaction on Acoustics, Speech, and Signal Processing*, vol. 37, No. 7, Jul. 1989, pp. 1099-1117.
Parhi, Keshab K. et al., "Static Rate-Optimal Scheduling of Iterative Data-Flow Programs via Optimum Unfolding," *IEEE Transactions on Computers*, vol. 40, No. 2, Feb. 1991, pp. 178-195.

(Continued)

Primary Examiner—Steven Nguyen
(74) Attorney, Agent, or Firm—Sterne, Kessler, Goldstein & Fox PLLC

(57) ABSTRACT

An n-level look-ahead network converts input values to intermediate values that are provided to a plurality of multiplexers arranged to form a pipelined multiplexer loop. The first stage of the multiplexer loop consists of a single multiplexer. The second stage consists of at least two multiplexers. Communication links couple the output ports of the second stage multiplexers to the input ports of the first stage multiplexer. A first feedback loop electrically couples the output port of the first stage multiplexer to the control port of the first stage multiplexer. This first feedback loop has a first delay device having a first delay time. A second feedback loop couples the output port of the first stage multiplexer to the control ports of the second stage multiplexers. This second feedback loop includes the first delay device and a second delay device having a second delay time.

20 Claims, 26 Drawing Sheets

OTHER PUBLICATIONS

Keshab K. Parhi, "Pipelining in Algorithms with Quantizer Loops," *IEEE Transactions on Circuits and Systems*, vol. 38, No. 7, Jul. 1991, pp. 745-754.

Keshab K. Parhi, "Low-Energy CSMT Carry Generators and Binary Adders," *IEEE Transactions on Very Large Scale Integration (VLSI) Systems*, vol. 7, No. 4, Dec. 1999, pp. 450-462.

Kasturia, Sanjay et al., "Techniques for High-Speed Implementation of Nonlinear Cancellation," *IEEE Journal on Selected Areas in Communications*, vol. 9, No. 5, Jun. 1991, pp. 711-717.

European Search Report for European Patent Application No. 03001717.2, 3 pages, dated Sep. 1, 2006.

* cited by examiner

PIPELINING OF MULTIPLEXER LOOPS IN A DIGITAL CIRCUIT

FIELD OF THE INVENTION

The present invention relates to digital circuits. More particularly, the present invention relates to pipelining of multiplexer loops in a digital circuit.

BACKGROUND OF THE INVENTION

Communicating information via the internet and other digital communications systems has become common in the United States and elsewhere. As the number of people using these communications systems has increased so has the need for transmitting digital data at ever increasing rates.

As will be understood by persons skilled in the relevant arts, digital communications systems are designed, for example, using look-ahead, pipelining, and parallelism techniques. These known techniques have enabled engineers to build digital communications systems, using available manufacturing technologies, which operate at data rates in excess of 1 Gb/s. These known techniques, however, cannot always be applied successfully to the design of higher speed digital communications systems. Applying these techniques is particularly difficult when dealing with nested feedback loops or multiplexer loops.

The use of look-ahead, for example, for fast computation of recursive loops is known. However, there are several approaches that can be used in applying look-ahead in the context of a multiplexer loop such as, for example, the multiplexer loop of a decision feedback equalizer found in modem transceivers. Many of these approaches will not improve the performance of the digital circuit to which they are applied, and some of these approaches can even degrade circuit performance. In similar fashion, the application of known pipelining and parallelism techniques to nested feedback loops or multiplexer loops in high speed digital communications systems will not necessarily result in improved performance.

There is a current need for new design techniques and digital logic circuits that can be used to build high-speed digital communication systems. In particular, design techniques and digital logic circuits are needed which can be used to build digital communications circuits that operate in excess of 2.5 Gb/s.

BRIEF SUMMARY OF THE INVENTION

A digital logic circuit and method for determining an output value based on a plurality of inputs values is provided. As described herein, the present invention can be used in a wide range of applications. The invention is particularly suited to high-speed digital communications systems, although the invention is not limited to just these systems.

In an embodiment of the invention, an n-level look-ahead network converts a plurality of input values to a plurality of intermediate values. These intermediate values are provided to a plurality of multiplexers. Each multiplexer has at least a first and a second input port, an output port, and a control port. The plurality of multiplexers are arranged to form a pipelined multiplexer loop having at least a first and a second stage. The multiplexers of the pipelined multiplexer loop are electrically coupled to the n-level look-ahead network.

In an embodiment, the first stage of the pipelined multiplexer loop consists of a single 2-to-1 multiplexer. The second stage consists of at least two 2-to-1 multiplexers. Communication links electrically couple the output ports of the second stage multiplexers to the input ports of the first stage multiplexer. A first feedback loop electrically couples the output port of the first stage multiplexer to the control port of the first stage multiplexer. This first feedback loop has a first delay device having a first delay time. A second feedback loop couples the output port of the first stage multiplexer to the control ports of the second stage multiplexers. This second feedback loop includes the first delay device and a second delay device having a second delay time. The first delay time is an integer multiple of the second delay time and is equal to (n+1) times a clock period of operation of the digital logic circuit.

In an embodiment, the n-level look-ahead network is a 2-level look-ahead network. The 2-level look-ahead network is formed using a plurality of 2-to-1 multiplexers. In this embodiment, the first delay time is nominally three times the second delay time.

In an embodiment, the digital logic circuit of the invention forms part of a transceiver circuit. For example, the digital logic circuit of the invention can be used to form a decision feedback equalizer. The invention can be used, for example, in backplane, optical/fiber, twisted-pair, and coaxial cable transceivers.

It is a feature of the invention that it can be used to form part of a communications system operating at a data rate of at least 3 gigabits per second.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

Figure 1:
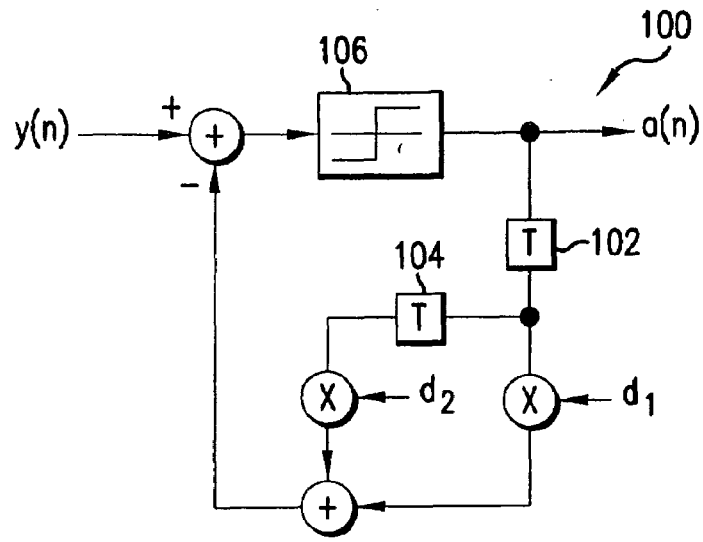
FIG. 1 illustrates an example 2-tap decision feedback equalizer circuit.

Modern digital communications systems contain circuits having feedback loops. These circuits are used to perform a variety of functions. For example, FIG. 1 illustrates a circuit 100 having two feedback loops. Circuit 100 is a 2-tap decision feedback equalizer (DFE).

Circuit 100 has two delay devices 102, 104 and a threshold device 106. In an embodiment, delay devices 102, 104 are flip-flops. In other embodiments, other devices such as registers are used. As will be understood by persons skilled in the relevant arts, the output of these devices change in accordance with a clock signal. Thus, the performance or rate at which circuit 100 can process data is limited by a clock period of operation. For circuit 100, the clock period of operation is limited by one multiply, two adds, and a thresholding (or compare) operation. However, for binary signaling, i.e., where a(n) is "0" or "1"; multiplication by "0" or "1" is typically not a factor.

The rate at which data is processed in a digital communications system can be increased through the use of parallelism or unfolding. For example, fast DFE implementations typically reformulate the DFE loop computation based on parallel branch delayed decision techniques where all possible outputs are computed and the correct output is selected by a multiplexer. The multiplexer is typically controlled by one or more previous outputs. In such implementations, the feedback loop is limited to a multiplexer delay only. The maximum operating performances or speed of a 2-to-1 multiplexer built using 0.13 micron photolithography technology is about 0.2 nanoseconds (ns).

Figure 2:
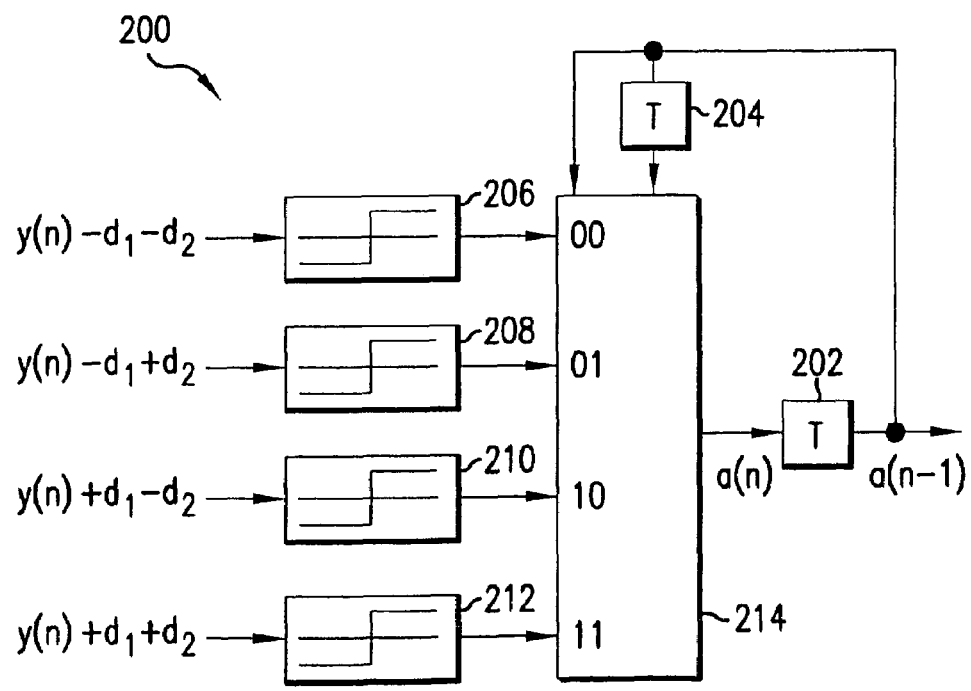
FIG. 2 illustrates an example circuit of a reformulated version of the decision feedback equalizer circuit of FIG. 1, where all four possible inputs are precomputed, and where an output is selected using a 4-to-1 multiplexer with two previous outputs acting as control signals.

FIG. 2 illustrates a circuit 200 formed by reformulating circuit 100 using a parallel branch delayed decision technique. Circuit 200 can process data at a higher rate than circuit 100. As illustrated in FIG. 2, circuit 200 has two delay devices 202, 204, four threshold devices 206, 208, 210, 212, and a 4-to-1 multiplexer 214. The inputs to the four threshold devices 206, 208, 210, 212 must be computed. As would be known to persons skilled in the relevant arts, the performance of circuit 200 is inherently limited by the operating performance of multiplexer 214. In general, an X-tap DFE can be reformulated and implemented using $2^X$ comparators and a $2^X$-to-1 multiplexer. The speed is limited by the $2^X$-to-1 multiplexer. It should be noted that if the signal a(n) has "Y" possible values or levels, it can be represented using a word-length of "b" bits, where "b" equals |log2(Y)|(i.e., log of Y with respect to base 2) and the function |r| represents the ceiling function which represents the smallest integer greater than or equal to "r." Such signals are often referred to as PAM-Y modulated signals (e.g., PAM-4 or PAM-5 modulated signals), which represent a signal with "Y" levels represented by pulse amplitude modulation. For a system using such signals, an X-tap DFE can be reformulated and implemented using $Y^X$ comparators and a $Y^X$-to-b multiplexer.

Figure 3:
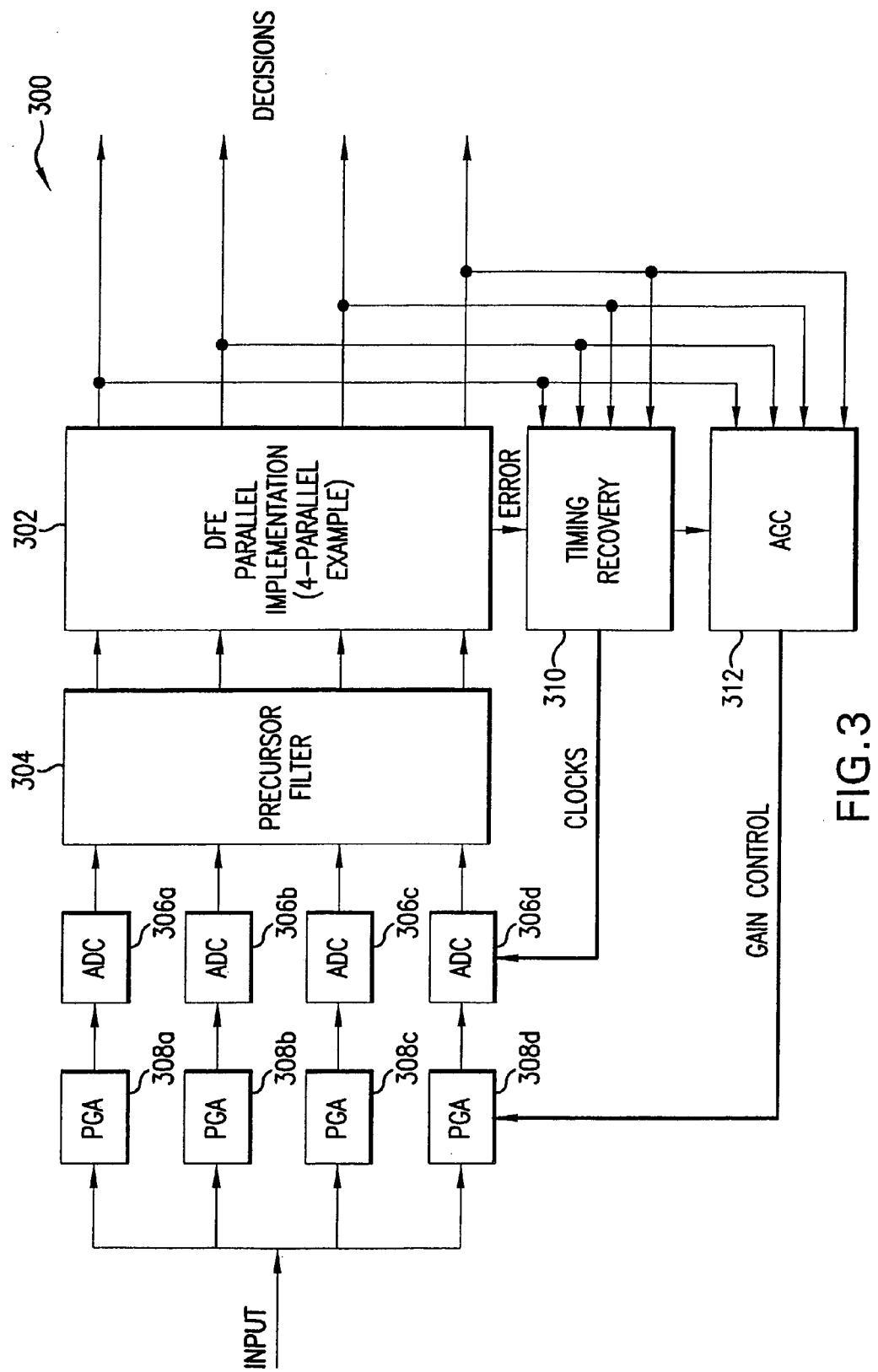
FIG. 3 illustrates how a 4-parallel embodiment decision feedback equalizer circuit is used in a backplane, fiber, or cable transceiver operating at high speed.

FIG. 3 illustrates a circuit 300 that implements a serdes (serializer/deserializer) for a backplane application, which makes use of a 4-parallel embodiment of a DFE. As shown in FIG. 3, circuit 300 has a DFE 302, a precursor filter 304, four analog-to-digital convertors (ADC) 306a, 306b, 306c, 306d, four programmable gain amplifiers (PGA) 308a, 308b, 308c, 308d, a timing recovery circuit 310, and an automatic gain control circuit 312.

A 6-tap DFE can be implemented using 64 comparators and a 64-to-1 multiplexer loop in a serial implementation. A 64-to-1 multiplexer loop 400 is illustrated in FIG. 4. 64-to-1 multiplexer loop 400 is implemented using sixty-three 2-to-1 multiplexers 402. 64-to-1 multiplexer loop 400 requires 32 instances of 2-to-1 multiplexer 402a, 16 instances of 2-to-1 multiplexer 402b, 8 instances of 2-to-1 multiplexer 402c, 4 instances of 2-to-1 multiplexer 402d, 2 instances of 2-to-1 multiplexer 402e, and 1 instance of 2-to-1 multiplexer 402f.

As will be understood by persons skilled in the relevant arts, 2-to-1 multiplexer 402f is highly loaded. Fan-out and a large capacitance typically reduce the expected performance of 64-to-1 multiplexer loop 400. For example, a typical computation time for multiplexer 402f, loaded as shown in FIG. 4, is about 0.45 ns (i.e., more than twice the 0.2 ns that can be achieved if multiplexer 402f were not heavily loaded).

Figure 4:
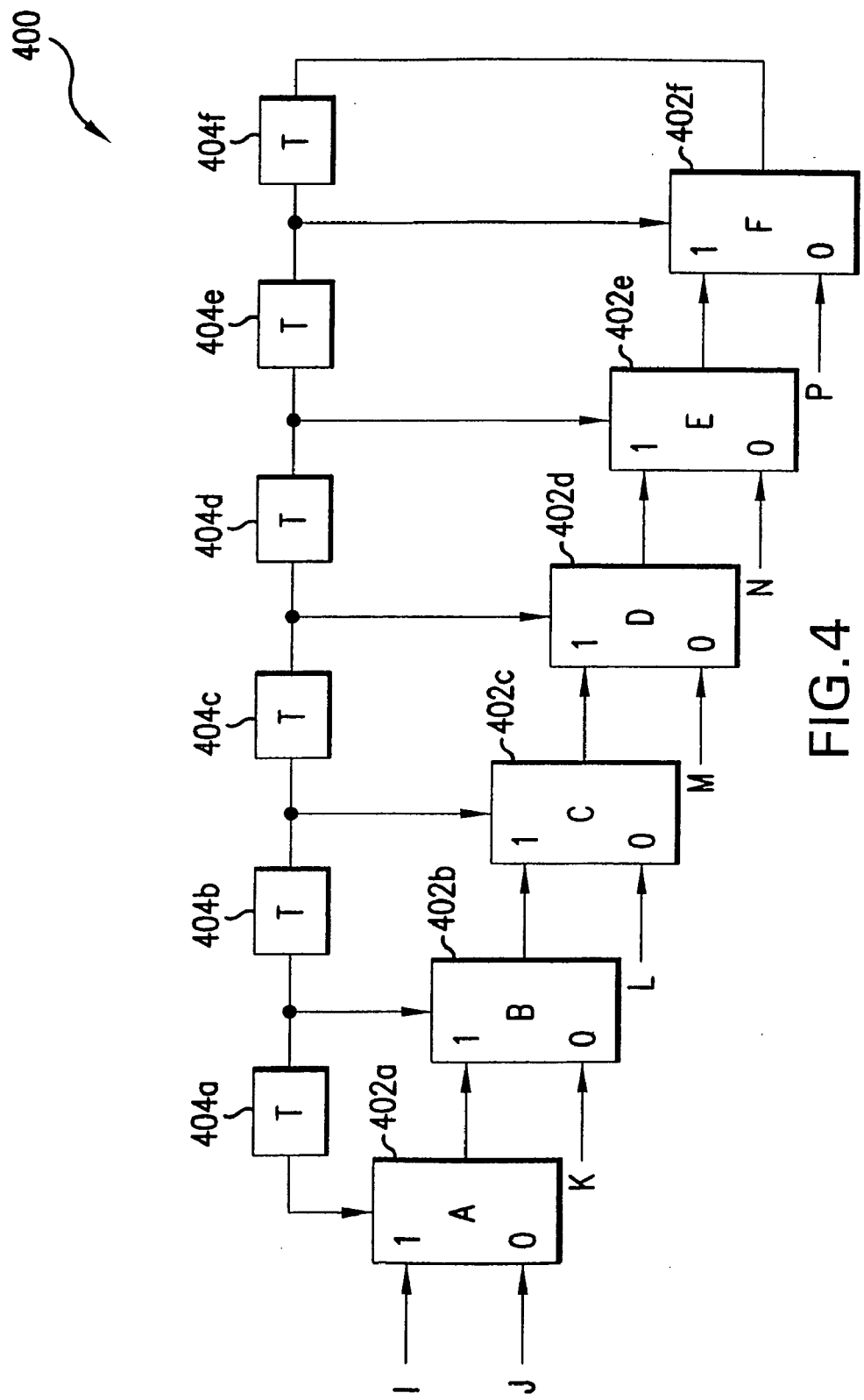
FIG. 4 illustrates 64-to-1 multiplexer loop.

As illustrated in FIG. 4, 64-to-1 multiplexer loop 400 has six delay devices 404a, 404b, 404c, 404d, 404e, 404f. These six delay devices form part of six nested feedback loops. As described herein, nested feedback loops limit the applicability of known design techniques used by engineers to build high-speed digital communications systems.

In order to understand how nested feedback loops limit the applicability of known design techniques, and how the present invention overcomes the limitations of the known design techniques, it is useful to consider an example design in which both known design techniques, and the techniques of the present invention, are applied to 64-to-1 multiplexer loop 400. First, however, the following terms are defined so that they may be used in the description that follows: loop; loop bound; critical loop; and iteration bound.

As used herein, "loop" means a directed path that begins and ends at the same node of a circuit.

As used herein, "loop bound" means a calculated time, wherein the loop bound of the j-th loop of a circuit is given by EQ. 1:

$$\frac{T_j}{W_j}$$ EQ. 1 where $T_j$ is the loop computation time and $W_j$ is the number of delays in the loop. This point is further illustrated by the circuit in FIG. 5.

Figure 5:
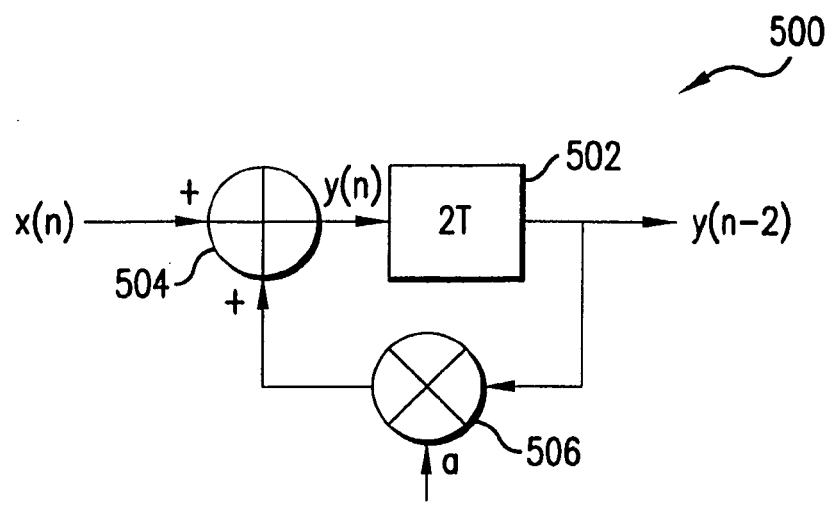
FIG. 5 illustrates a circuit having a single feedback loop.

FIG. 5 illustrates a circuit 500 having a single loop (i.e., a feedback loop). This single loop contains two delays (shown in FIG. 5 as a single delay device 502 such as, for example, a 2-bit shift register or 2 latches in series). Circuit 500 has an adder 504 and a multiplier 506. The output of circuit 500, y(n), is given by EQ. 2:

$$y(n)=a*y(n-2)+x(n)$$ EQ. 2

Assuming that the combined computation time of adder 504 and multiplier 506 is 10 ns, the loop bound of the feedback loop of circuit 500 is 5 ns (i.e., 10 ns/2 delays=5 ns).

As used herein, "critical loop" means the loop of a circuit having the longest loop bound. A circuit may have more than just one critical loop.

As used herein, "iteration bound" means the loop bound of the critical loop of a circuit. This point is further illustrated by FIG. 6.

Figure 6:
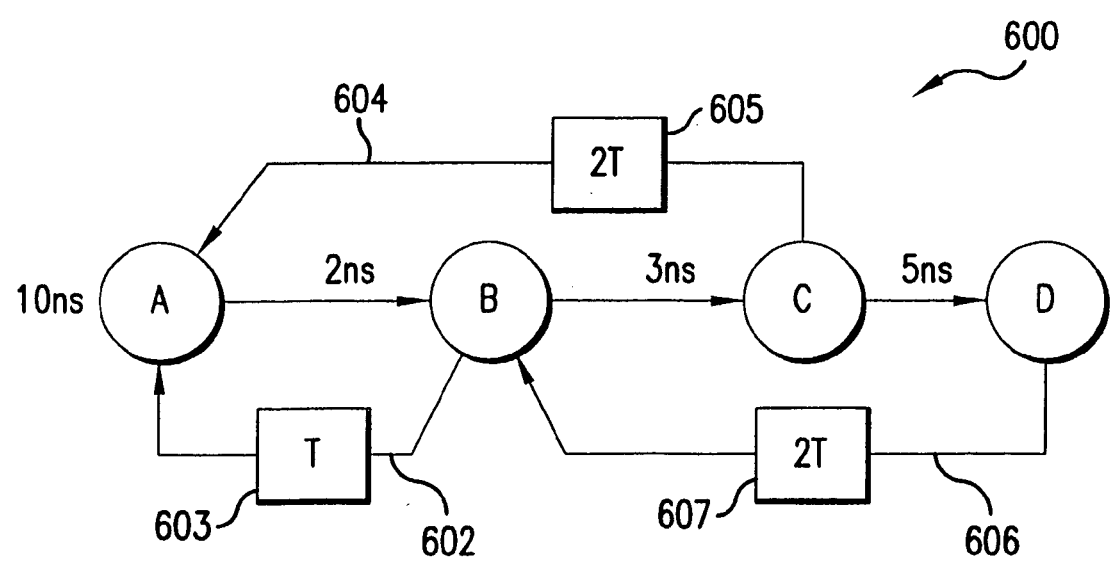
FIG. 6 illustrates a circuit having three feedback loops.

FIG. 6 illustrates a circuit 600 having three loops 602, 604, 606. Loop 602 starts at node A, goes to node B, and returns to node A. Loop 602 contains a single delay 603. Loop 604 starts at node A, goes to node B, goes to node C, and returns to node A. Loop 604 contains two delays 605. Loop 606 starts at node B, goes to node C, goes to node D, and returns to node B. Loop 606 also contains two delays 607. As shown in FIG. 6, the computation times of node A is 10 ns. The computation time of node B is 2 ns. The computation time of node C is 3 ns. The computation time of node B is 5 ns.

In accordance with EQ. 1, the loop bound of loop 602 is 12 ns ((10 ns+2 ns)/1 delay=12 ns). The loop bound of loop 604 is 7.5 ns ((10 ns+2 ns+3 ns)/2 delay=7.5 ns). The loop bound of loop 606 is 5 ns ((2 ns+3 ns+5 ns)/2 delay 5 ns). Thus, the iteration bound of circuit 600 is 12 ns (i.e., the maximum of 12 ns, 7.5 ns, and 5 ns).

As can be see in FIG. 4, every feedback loop of 64-to-1 multiplexer loop 400 is a critical loop. The iteration bound of 64-to-1 multiplexer loop 400 is the computation time of a single 2-to-1 multiplexer 402.

A design example will now be described in order to illustrate the present invention and how the present invention overcomes the deficiencies of techniques and digital logic circuits known in the relevant arts.

As described above, fan-out and a large capacitance typically degrade the expected performance of 64-to-1 multiplexer loop 400. This problem is compounded when unfolding or parallelism techniques are applied in order to design a high-speed digital communications system. To illustrate this point, consider the following example in which known design techniques are applied to 64-to-1 multiplexer loop 400 in order to build a high-speed digital communications system.

The example starts by assuming that a maximum clocking rate of 500 MHz can be achieved, using an available manufacturing technology. Given a maximum achievable clocking rate of 500 MHz, the clocking period of the example circuit will be 2 ns. It will be assumed for purposes of the example that an iteration bound of less than 1.7 ns must be achieved in order to provide sufficient operating margin or the circuit design will be unacceptable.

Figure 7:
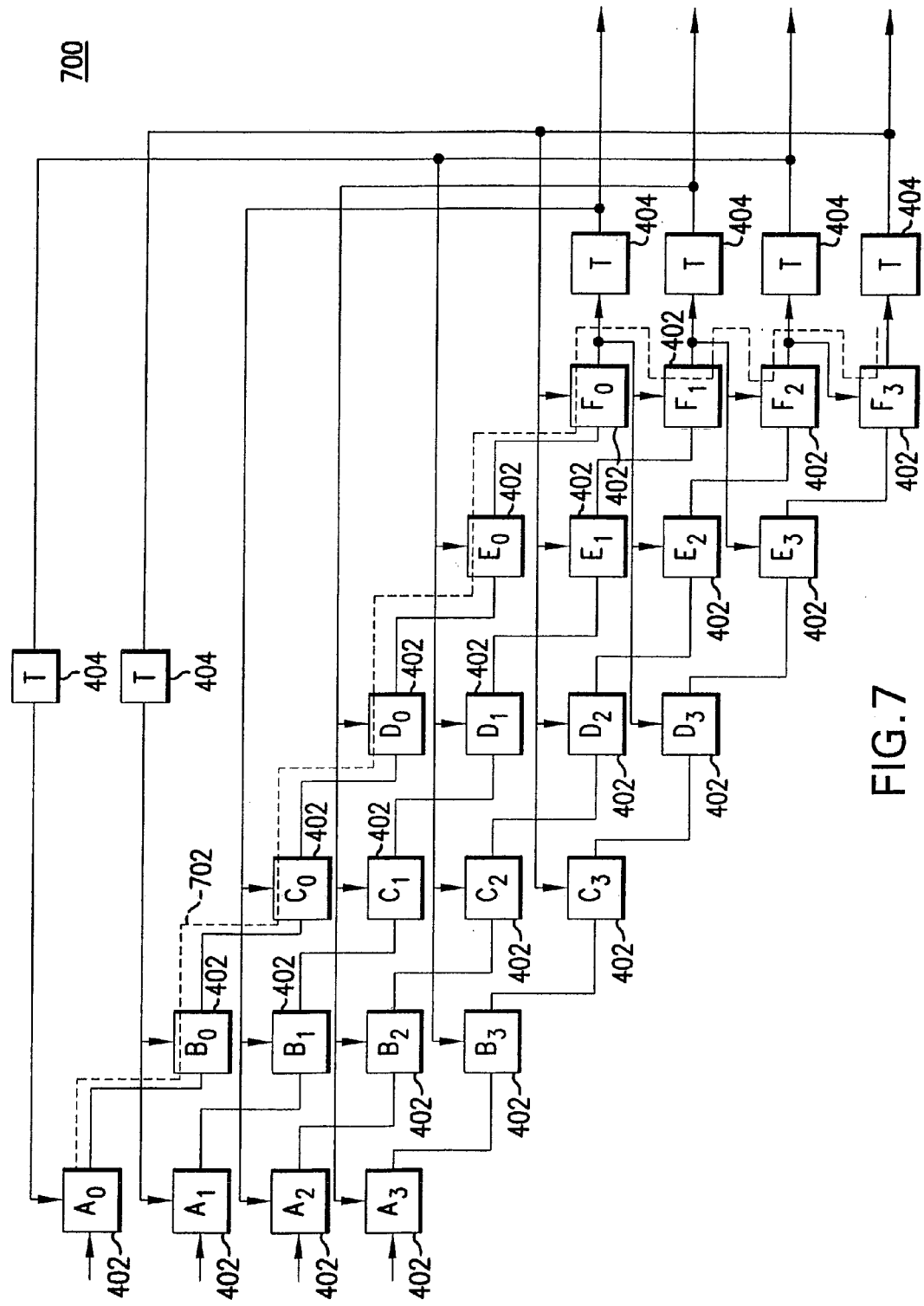
FIG. 7 illustrates a 4-unfolded multiplexer loop circuit obtained by unfolding the multiplexer loop of FIG. 4 by a factor of four.

The example involves designing a 4-parallel implementation of a 6-tap DFE. FIG. 7 illustrates a 4-unfolded multiplexer loop circuit 700, which is obtained from the 64-to-1 multiplexer loop circuit 400 shown in FIG. 4. Circuit 700 contains several 2-to-1 multiplexers 402 and several delays 404. The critical path of circuit 700 is illustrated by a dashed line 702. As can be seen is FIG. 7, the critical path involves nine 2-to-1 multiplexers 402. The expected computation time of nine 2-to-1 multiplexers is 1.8 ns (i.e., 9×0.2 ns=1.8 ns). Thus, circuit 700 does not satisfy the design criterion of having an iteration bound of less than 1.7 ns. As would be known to persons skilled in the relevant arts, retiming may be used to reduce the number of 2-to-1 multiplexers 402 in the critical path.

Figure 8:
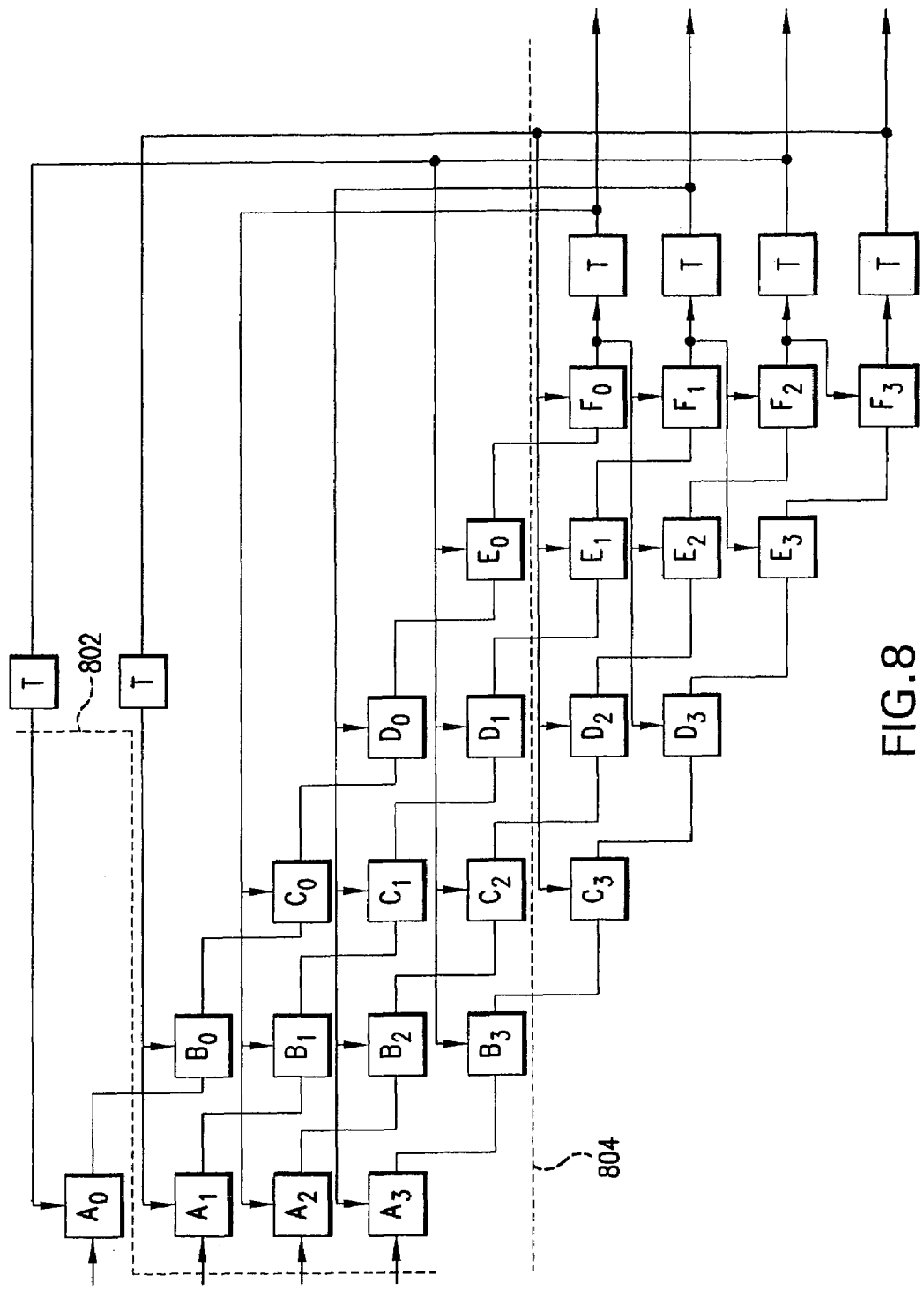
FIG. 8 illustrates two cut-sets that can be used to retime the circuit of FIG. 7.

FIG. 8 illustrates two cut-sets 802, 804 that can be used to reduce the number of 2-to-1 multiplexers 402 in the critical path of circuit 700.

Figure 9:
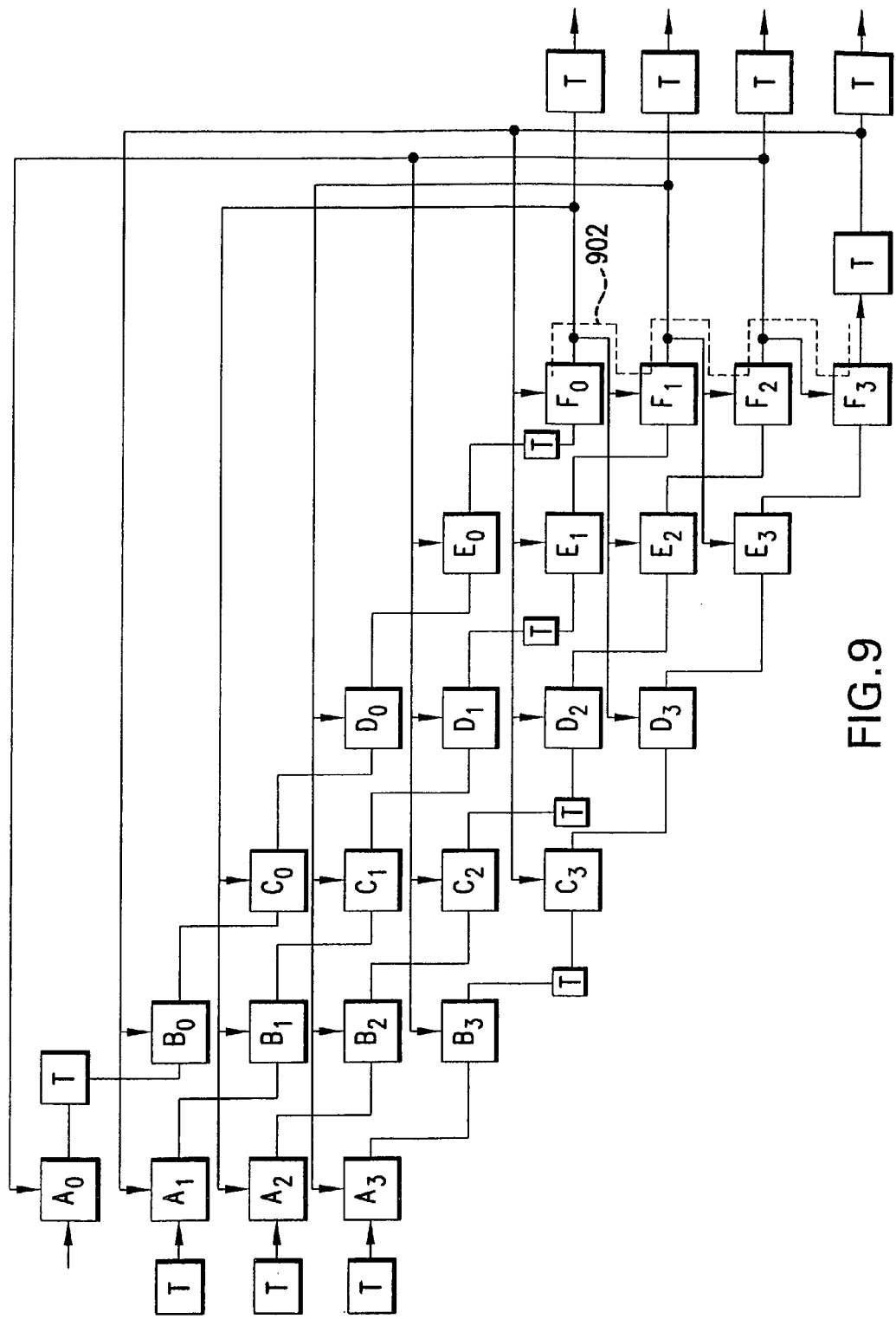
FIG. 9 illustrates the retimed 4-unfolded multiplexer loop of FIG. 7.

FIG. 9 illustrates the retimed 4-unfolded loop of FIG. 8. As can be seen in FIG. 9, the critical path (shown by a dashed line 902) now involves just four 2-to-1 multiplexers 402. This is misleading, however, because as described above, the four multiplexers ($F_0$, $F_1$, $F_2$, and $F_3$) in the critical path are heavily loaded. Rather than having an expected iteration bound of 0.8 ns (i.e., 4×0.2 ns=0.8 ns), the actual iteration bound is 1.8 ns (i.e., 4×o.45 ns=1.8 ns). Thus, as illustrated by FIG. 9, the known techniques of unfolding and retiming cannot be applied to the nested loops of 64-to-1 multiplexer loop 400. Applying these known techniques has led to an unacceptable circuit design.

Another known technique that can be used to improve the iteration bound of a circuit is pipelining combined with look-ahead. This technique is illustrated by FIGS. 10 and 11.

Figure 10:
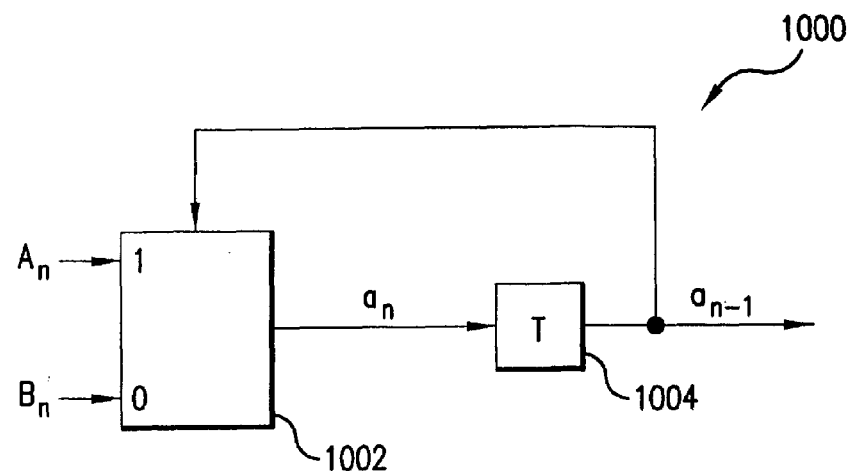
FIG. 10 illustrates a 2-to-1 multiplexer loop circuit.

FIG. 10 illustrates a 2-to-1 multiplexer loop circuit 1000. Circuit 1000 has a 2-to-1 multiplexer 1002 and a delay 1004. Assuming multiplexer 1002 has a computation time of 0.2 ns, the iteration bound of circuit 1000 is 0.2 ns (i.e., 0.2 ns/1 delay=0.2 ns). The output, $a_n$, of circuit 1000 is given by EQ. 3:

$$a_n = A_n * a_{n-1} + B_n * \overline{a}_{n-1}$$ EQ. 3

Figure 11:
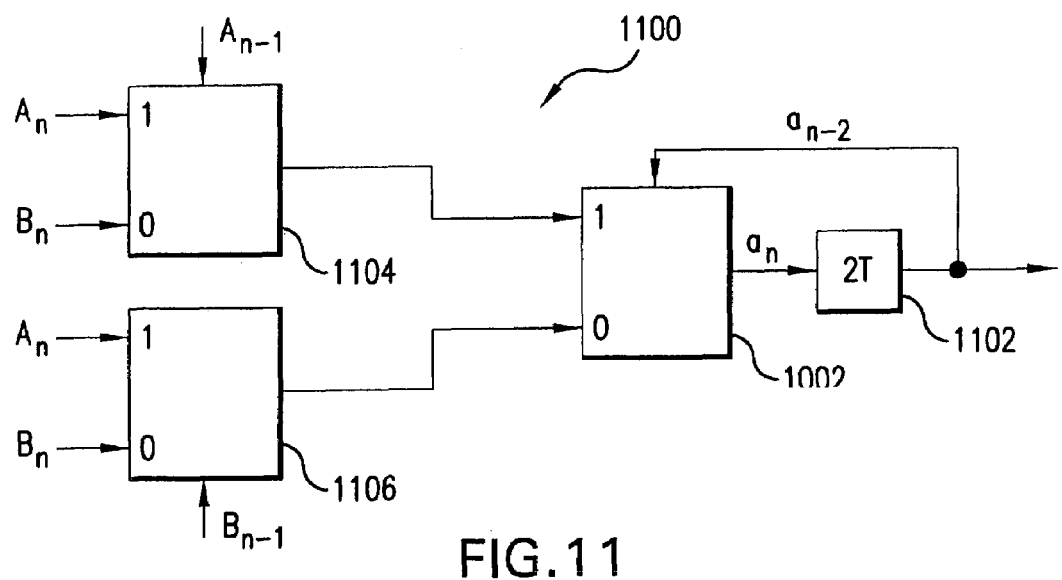
FIG. 11 illustrates a circuit that can be formed by applying pipelining and look-ahead to the circuit of FIG. 10.

FIG. 11 illustrates a circuit 1100 that can be formed by applying pipelining and look-ahead to circuit 1000. Circuit 1100 has a delay 1102, a multiplexer 1104, and a multiplexer 1106 in addition to the multiplexer 1002 of circuit 1000. The output of circuit 1100 is given by EQ. 5, which is obtained by substituting previous iterations of EQ. 3 and EQ. 4 in EQ. 3.

$$\overline{a}_n = \overline{A}_n a_{n-1} + \overline{B}_n \overline{a}_{n-1}$$ EQ.4

$$a_n = A_n[A_{n-1}a_{n-2} + B_{n-1}\overline{a}_{n-2}] +$$ EQ. 5
$$B_n[\overline{A}_{n-1}a_{n-2} + \overline{B}_{n-1}\overline{a}_{n-2}]$$
$$= [A_n A_{n-1} + \overline{A}_{n-1} B_n]a_{n-2} +$$
$$[A_n B_{n-1} + B_n \overline{B}_{n-1}]\overline{a}_{n-2}$$

Assuming the computation time of each of the multiplexers of circuit 1100 is 0.2 ns, the iteration bound of circuit 1100 is 0.1 ns (i.e., 0.2 ns/2 delays=0.1 ns). Thus, the known method for applying pipelining and look-ahead to circuit 1000 has improved the iteration bound by a factor of 2.

Figure 12:
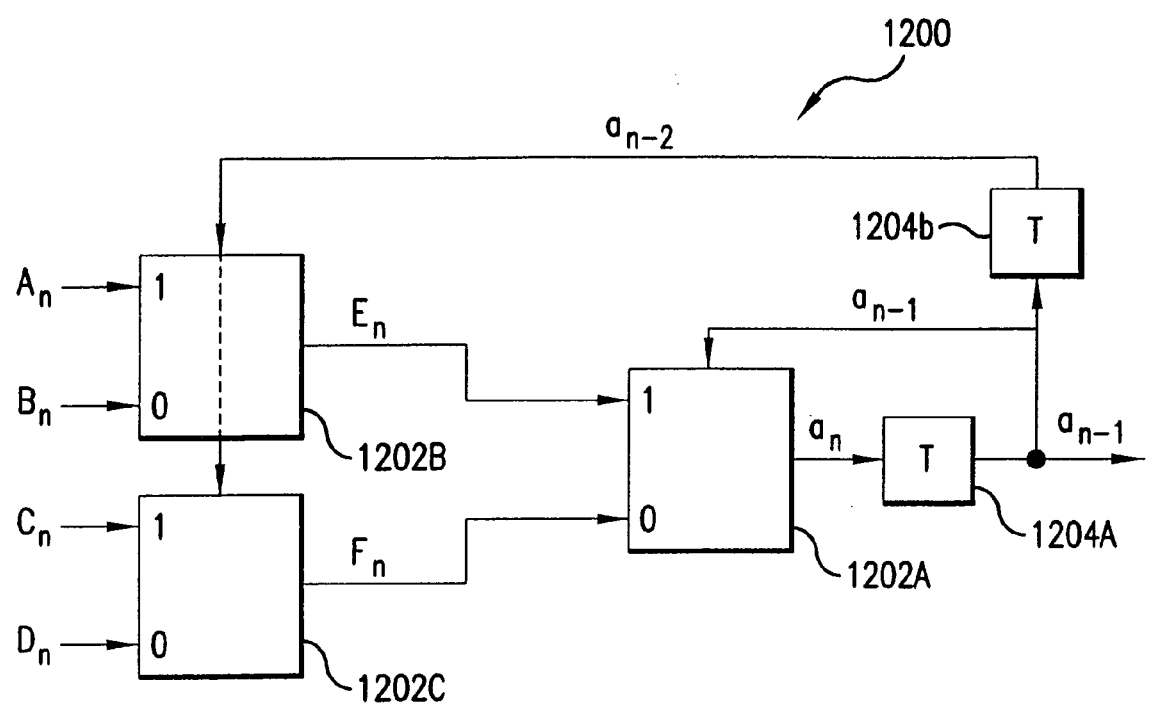
FIG. 12 illustrates a 4-to-1 multiplexer loop circuit.
Figure 13:
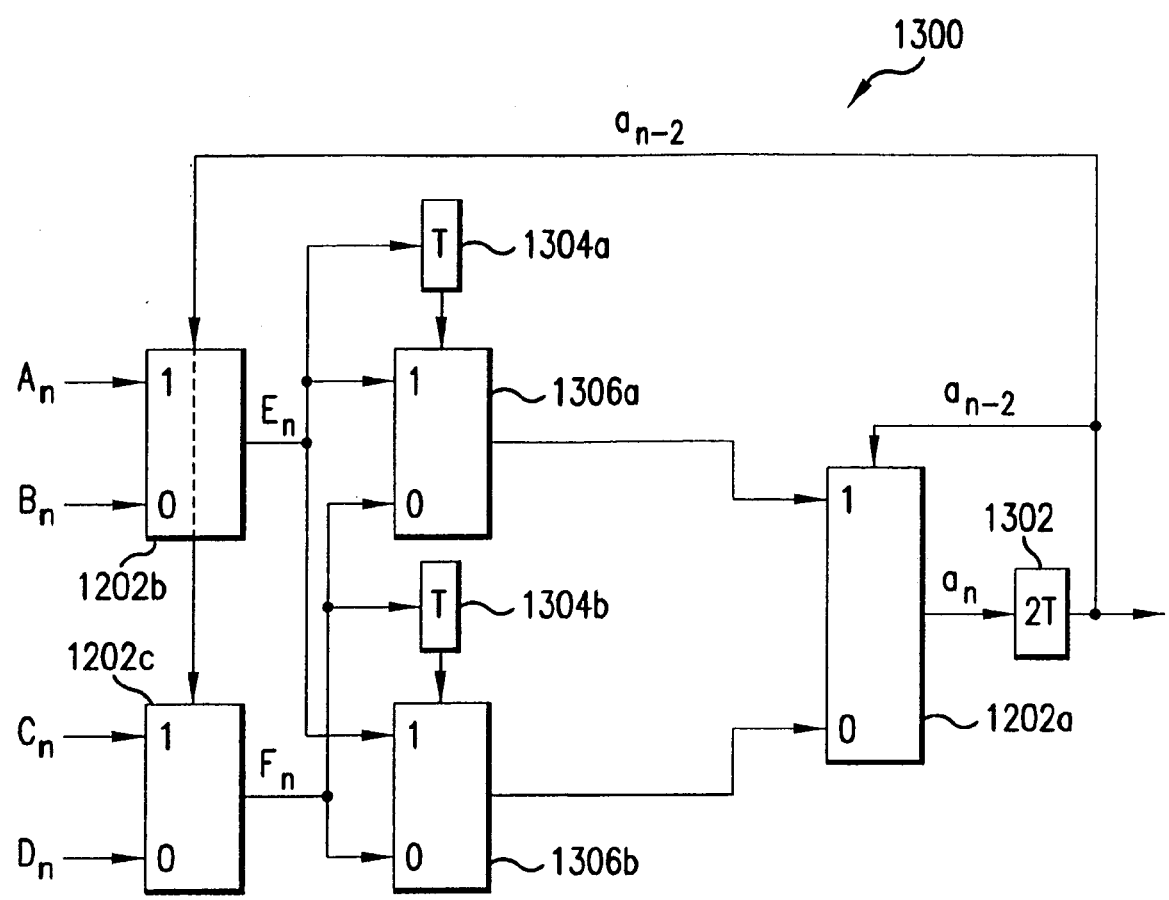
FIG. 13 illustrates a circuit developed by applying a first form of pipelining and look-ahead to the circuit of FIG. 12.
Figure 14:
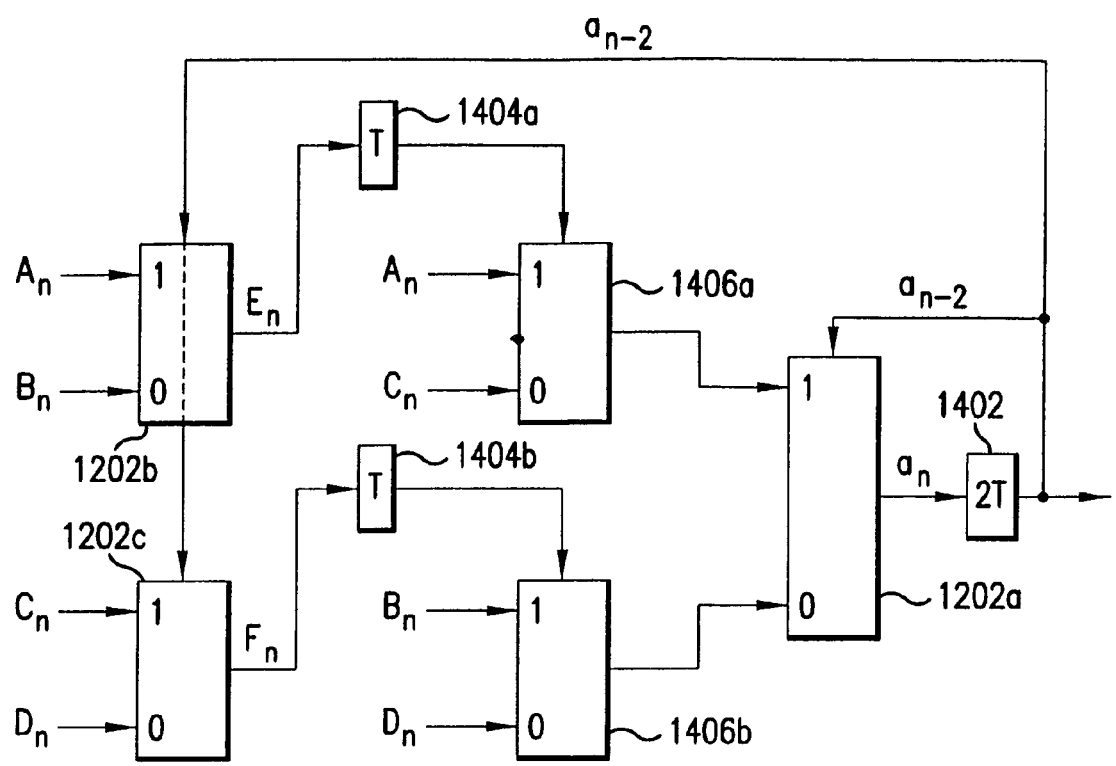
FIG. 14 illustrates a circuit developed by applying a second form of pipelining and look-ahead to the circuit of FIG. 12.

This is not the case, however, when the method is applied to a circuit having nested feedback loops such as 64-to-1 multiplexer loop 400, as illustrated by FIGs. 12–14. As will become apparent to persons skilled in the relevant arts given the description herein, there are several approaches that can be used in applying pipelining and look-ahead in the context of a multiplexer loop. The known relevant art does not teach or suggest which form of pipelining and look-ahead, if any, will improve the performance of a circuit having nested feedback loops.

As described herein, the present invention fills this void.

FIG. 12 illustrates a 4-to-1 multiplexer loop circuit 1200. Circuit 1200 can also be thought of as forming the first two stages of any multiplexer loop that is 4-to-1 or larger. The first stage consists of multiplexer 1202a. The second stage consists of multiplexers 1202b, 1202c. The output of circuit 1200 is given by the following equations:

$$\begin{cases} E_n = A_n a_{n-2} + B_n \bar{a}_{n-2} \\ \bar{E}_n = \bar{A}_n a_{n-2} + \bar{B}_n \bar{a}_{n-2} \end{cases} \qquad \text{EQ. 6a}$$

$$\begin{cases} F_n = C_n a_{n-2} + D_n \bar{a}_{n-2} \\ \bar{F}_n = \bar{C}_n a_{n-2} + \bar{D}_n \bar{a}_{n-2} \end{cases} \qquad \text{EQ. 6b}$$

$$a_n = E_n a_{n-1} + F_n \bar{a}_{n-1} \qquad \text{EQ. 6c}$$
$$\bar{a}_n = \bar{E}_n a_{n-1} + \bar{F}_n \bar{a}_{n-1}$$

As shown in FIG. 12, circuit 1200 has three multiplexers 1202a, 1202b, 1202c, and two delay devices 1204a, 1204b. Assuming multiplexer 1202a has a computation time of 0.4 ns (i.e., it is highly loaded) and the other two multiplexers 1202b, 1202c, each have a computation time of 0.2 ns, the iteration bound of circuit 1200 is 0.4 ns.

FIG. 13 illustrates a circuit 1300 developed by applying one form of pipelining and look-ahead to circuit 1200. As described herein, this form does not improve the performance of circuit 1200. It is shown only so that it can be contrasted with the present invention.

As shown in FIG. 13, circuit 1300 is formed by adding three delays 1302, 1304a, 1304b, and two multiplexers 1306a, 1306b to circuit 1200. The output of circuit 1300 is given by EQs. 7a and 7b. EQ. 7a is obtained by substituting past iterations of EQ. 6c in itself.

$$a_n = E_n[E_{n-1} a_{n-2} + F_{n-1} \bar{a}_{n-2}] + \qquad \text{EQ. 7a}$$
$$F_n[\bar{E}_{n-1} a_{n-2} + \bar{F}_{n-1} \bar{a}_{n-2}]$$

$$a_n = [E_n E_{n-1} + F_n \bar{E}_{n-1}] a_{n-2} + \qquad \text{EQ. 7b}$$
$$[E_n F_{n-1} + F_n \bar{F}_{n-1}] \bar{a}_{n-2}$$

Assuming the computation time of each multiplexer 1306a, 1306b is 0.2 ns, the loop bound of the inner nested loop is 0.2 ns. But, the loop bound of the outer loop is 0.4 ns. Thus, as stated above, this application is not useful for improving the performance of a multiplexer loop.

FIG. 14 illustrates a circuit 1400 developed by applying a second form of pipelining and look-ahead to circuit 1200. This form also is not very useful for improving the performance of circuit 1200. This form is also shown so that it can be contrasted with the present invention. The output of circuit 1400 is given EQs. 8a and 8b. EQ. 8a is obtained by substituting past iterations of EQ. 6a and EQ. 6c in EQ. 6a.

$$a_n = (A_n a_{n-2} + B_n \bar{a}_{n-2})(E_{n-1} a_{n-2} + F_{n-1} \bar{a}_{n-2}) + \qquad \text{EQ. 8a}$$
$$(C_n a_{n-2} + D_n \bar{a}_{n-2})(\bar{E}_{n-1} a_{n-2} + \bar{F}_{n-1} \bar{a}_{n-2})$$

$$a_n = \begin{pmatrix} A_n E_{n-1} + \\ C_n \bar{E}_{n-1} \end{pmatrix} a_{n-2} + \begin{pmatrix} B_n F_{n-1} + \\ D_n \bar{F}_{n-1} \end{pmatrix} \bar{a}_{n-2} \qquad \text{EQ. 8b}$$

Assuming the computation time of each of multiplexers 1406a, 1406b is 0.2 ns, the loop bound of the inner nested loop is 0.2 ns. The loop bound of the outer loop is 0.3 ns. While this is an improvement over the form illustrated by FIG. 13, it still does not resolve the decreased performance of the multiplexer loop. In the 4-unfolded parallel design of FIG. 9, applying this form of pipelining and look-ahead results in an expected iteration bound of about 1.2 ns, which is less than the 1.7 ns criterion. But, for reasons described herein, this iteration bound may not be achievable. Furthermore, as described below, the iteration bound can be reduced even further than this by applying the pipelining and look-ahead techniques of the invention. In comparison, the invention significantly increases the clock speed or symbol speed that can be achieved.

Figure 15A:
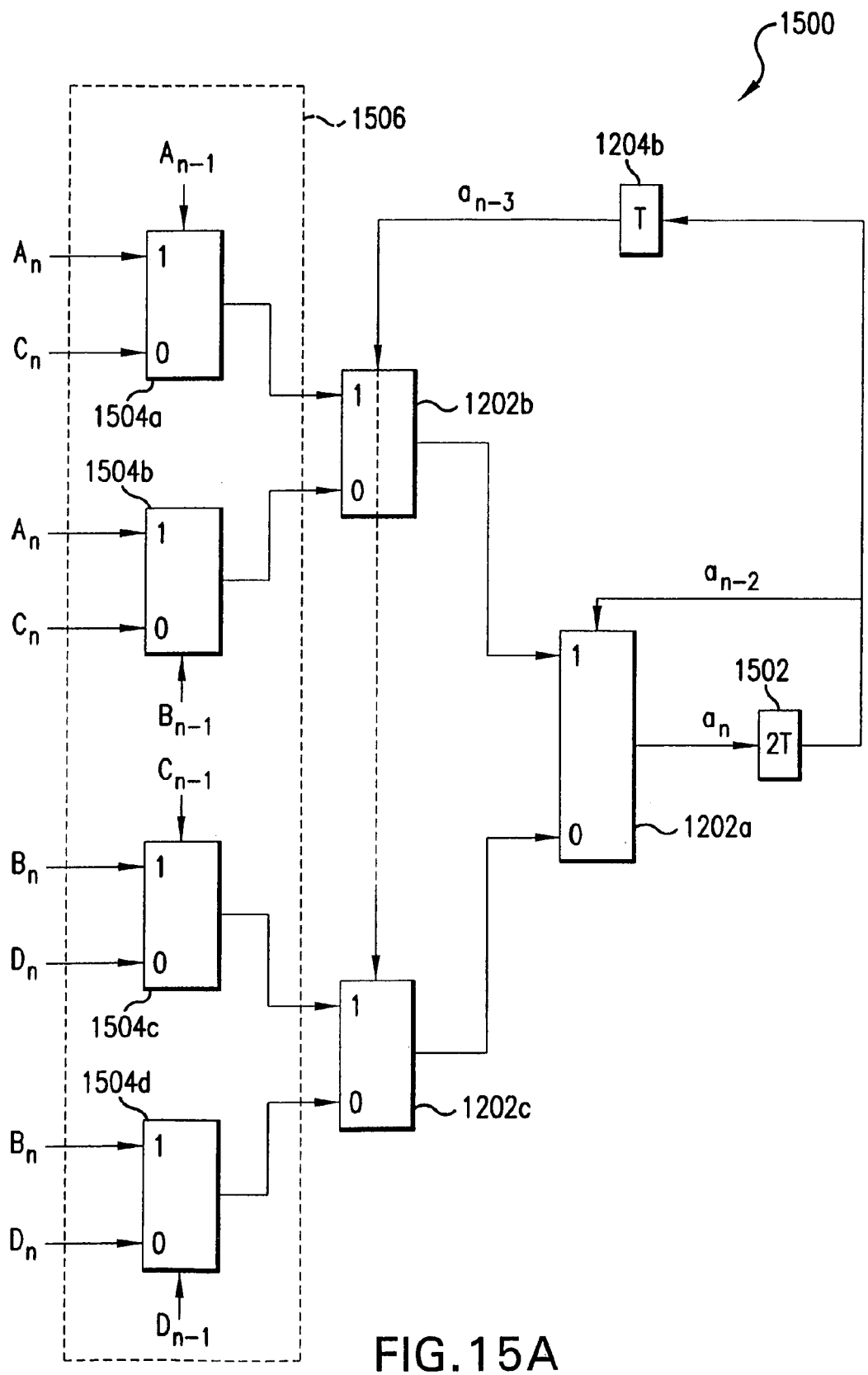
FIG. 15A illustrates a circuit according to an embodiment of the invention.

In contrast to the pipelining and look-ahead forms of FIGS. 13 and 14, the pipelining and look-ahead of FIG. 15A solves the issue of degraded multiplexer loop performance described above. This is because the loop bound of every feedback loop of the multiplexer loop is improved rather than just improving the performance of one loop to the detriment of another loop.

FIG. 15A illustrates a circuit 1500, according to an embodiment of the invention, that is formed by adding a delay 1502 and four 2-to-1 multiplexers 1504a, 1504b, 1504c, 1504d to circuit 1200. As shown in FIG. 15A, each of the 2-to-1 multiplexers has two input ports, one control port, and one output port. Note that none of the 2-to-1 multiplexers 1504a, 1504b, 1504c, 1504d is included in a feedback loop. These multiplexers form part of a 1-level look-ahead network 1506. The extra delay added to circuit 1200 forms a part of the innermost nested loop.

The output of circuit 1500 is given by the following equations:

$$\bar{a}_n = (\bar{A}_n a_{n-2} + \bar{B}_n \bar{a}_{n-2}) a_{n-1} + (\bar{C}_n a_{n-2} + \bar{D}_n \bar{a}_{n-2}) \bar{a}_{n-1}$$

$$a_n = (A_n a_{n-2} + B_n \bar{a}_{n-2}) a_{n-1} + (C_n a_{n-2} + D_n \bar{a}_{n-2}) \bar{a}_{n-1}$$

$$a_n = (A_n a_{n-2} + B_n \bar{a}_{n-2}) \begin{bmatrix} (A_{n-1} a_{n-3} + B_{n-1} \bar{a}_{n-3}) a_{n-2} + \\ (C_{n-1} a_{n-3} + D_{n-1} \bar{a}_{n-3}) \bar{a}_{n-2} \end{bmatrix} +$$
$$(C_n a_{n-2} + D_n \bar{a}_{n-2}) \begin{bmatrix} (\bar{A}_{n-1} a_{n-3} + \bar{B}_{n-1} \bar{a}_{n-3}) a_{n-2} + \\ (\bar{C}_{n-1} a_{n-3} + \bar{D}_{n-1} \bar{a}_{n-3}) \bar{a}_{n-2} \end{bmatrix}$$

$$a_n = A_n (A_{n-1} a_{n-3} + B_{n-1} \bar{a}_{n-3}) a_{n-2} +$$
$$B_n (C_{n-1} a_{n-3} + D_{n-1} \bar{a}_{n-3}) \bar{a}_{n-2} +$$
$$C_n (\bar{A}_{n-1} a_{n-3} + \bar{B}_{n-1} \bar{a}_{n-3}) a_{n-2} +$$
$$D_n (\bar{C}_{n-1} a_{n-3} + \bar{D}_{n-1} \bar{a}_{n-3}) \bar{a}_{n-2}$$

$$a_n = [(A_n A_{n-1} + C_n \bar{A}_{n-1}) a_{n-3} + (A_n B_{n-1} + C_n \bar{B}_{n-1}) \bar{a}_{n-3}] a_{n-2} +$$
$$[(B_n C_{n-1} + D_n \bar{C}_{n-1}) a_{n-3} + (B_n D_{n-1} + D_n \bar{D}_{n-1}) \bar{a}_{n-3}] \bar{a}_{n-2}$$

The iteration bound of circuit 1500 is 0.2 ns. As will become apparent to persons skilled in the relevant arts given the description herein, the pipelining and look-ahead of the invention increases the performance of the nested loop without degrading the performance of the outer loop. In fact, as can be seen in FIG. 15A, the invention can be used to restore the performance of the multiplexer loop to an expected level of performance (e.g., 0.2 ns).

Figure 15B:
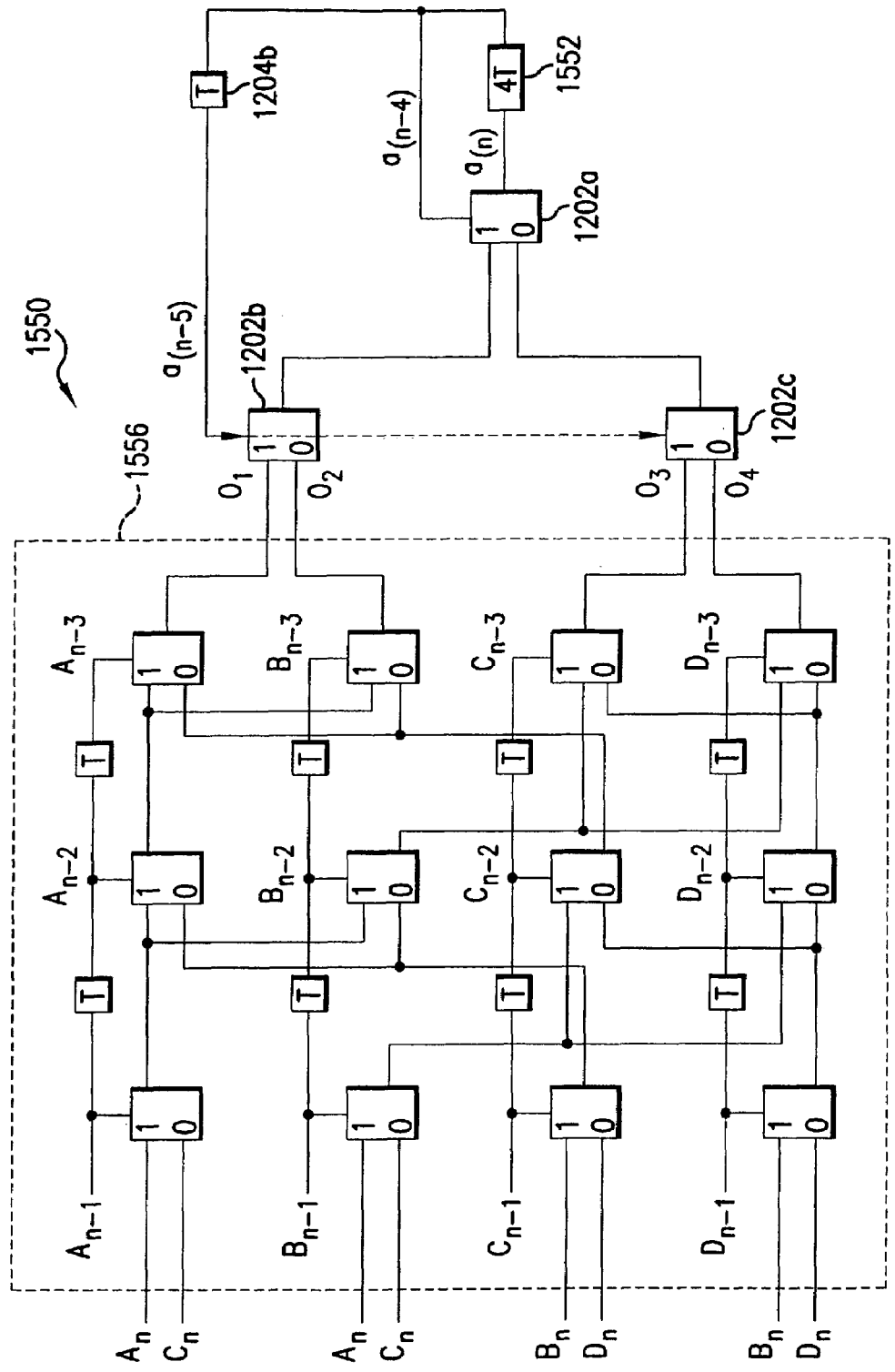
FIG. 15B illustrates a circuit having a 3-level look-ahead network according to an embodiment of the invention.

FIG. 15B illustrates a circuit 1550 having a 3-level look-ahead network 1556 according to an embodiment of the invention. Circuit 1550 is formed by adding a delay 1552 and 3-level look-ahead network 1556 to circuit 1200. As shown in FIG. 15B, each of the 2-to-1 multiplexers has two input ports, one control port, and one output port. In accordance with the invention, the extra delay added to circuit 1200 forms a part of the innermost nested loop.

As shown in FIG. 15B, 3-level look-ahead network 1556 is formed using multiplexers and delays. 3-level look-ahead network 1556 transforms the four input values $A_n$, $B_n$, $C_n$, and $D_n$ into four intermediate values $O_1$, $O_2$, $O_3$, and $O_4$. As will be understood by persons skilled in the relevant arts, other circuits can be used to implement a 3-level look-ahead network.

As described in more detail below, the invention can be implemented in a manner that will achieve an objective not obtainable by circuits 1300 and 1400. As described below, the invention can be implemented in a multiplexer loop such that the performance degradation caused by the heavy loading of multiplexer 1202a is completely eliminated without increasing the loop bound of any loop. This is achieved by adding delay to the innermost nested feedback loop and by not adding any multiplexers within a loop of the multiplexer loop. As stated herein, a benefit of adding delay to the innermost feedback loop is that it improves the loop bound of every loop forming a part of the multiplexer loop.

Figure 16:
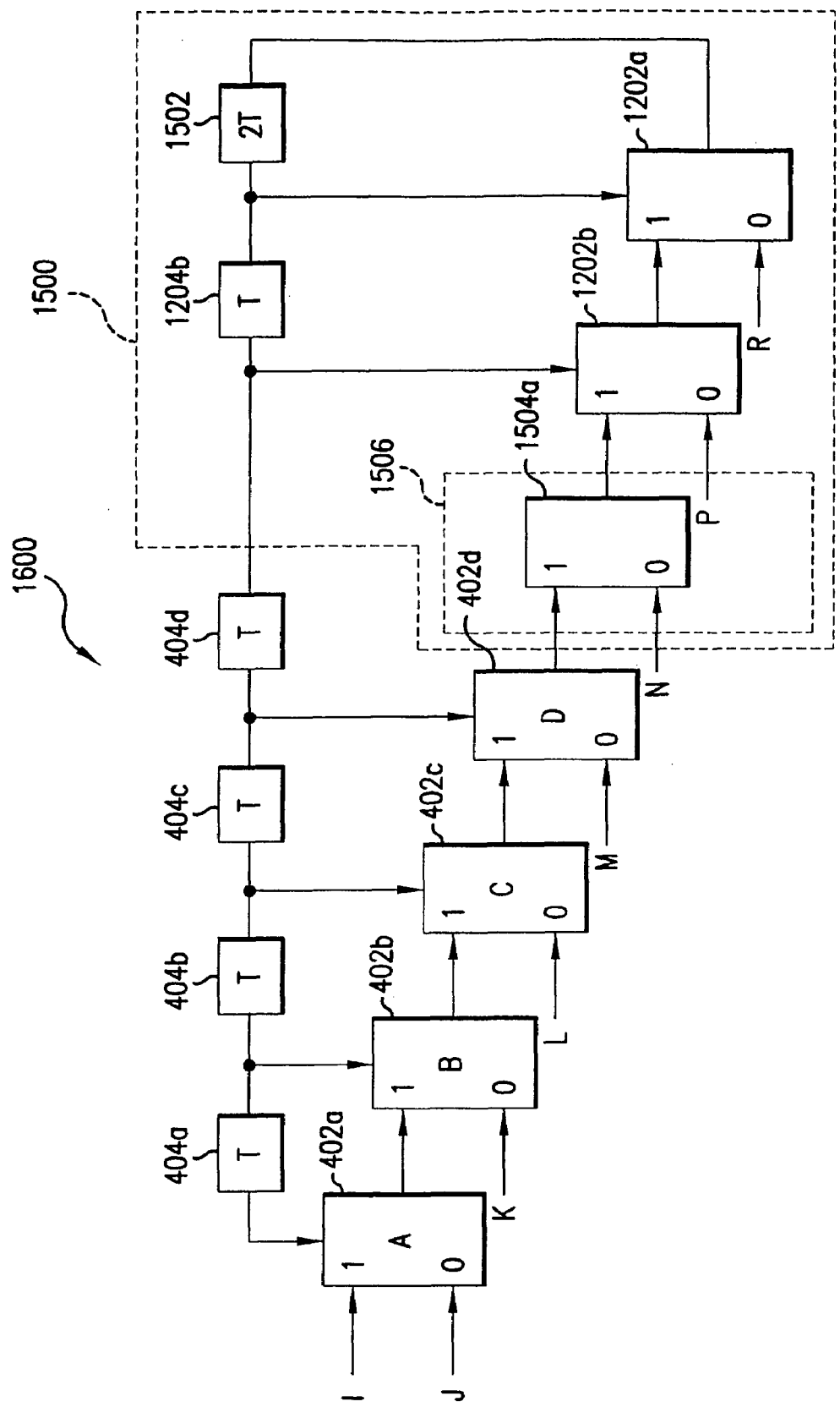
FIG. 16 illustrates a 64-to-1 multiplexer loop that incorporates the circuit of FIG. 15A.

Returning to the example design application, FIG. 16 illustrates a 64-to-1 multiplexer loop circuit 1600 that incorporates the embodiment of invention shown in FIG. 15A. As can be seen in FIG. 16, circuit 1600 is formed from multiplexer loop 400 and circuit 1500. The loop bound of the loop containing multiplexers 402d, 1504a, 1202b, 1202a and delays 1502, 1204b, 404d is 0.25 ns (i.e., (0.2 ns+0.2 ns+0.2 ns+0.4 ns)/4 delays=0.25 ns). As will become apparent to persons skilled in the relevant arts given the description herein, the iteration bound of circuit 1600 is 0.25 ns.

If look-ahead network 1506 is moved to a position between multiplexers 402c and 402d, the iteration bound of circuit is not changed (i.e, it remains at 0.25 ns). The number of multiplexers included in look-ahead network 1506, however, must be increased from 4 to 8.

In similar fashion, moving look-ahead network 1506 to a position between multiplexers 402b and 402c or to a position between multiplexers 402a and 402b also will not change the iteration bound of circuit 1600. The number of multiplexers included in look-ahead network 1506, however, will have be increased from 4 to 16, or 4 to 32, respectfully.

If look-ahead network 1506 is moved to a location before multiplexer 402a, the iteration bound of circuit 1600 is reduced. It is reduced to 0.2 ns, and every loop of circuit 1600 becomes a critical loop. This design requires increasing the number of multiplexers of look-ahead network 1506 from 4 to 64. Thus, as can be seen from FIG. 16, it is advantageous to position look-ahead network 1506 in front of multiplexer 402a.

Figure 17:
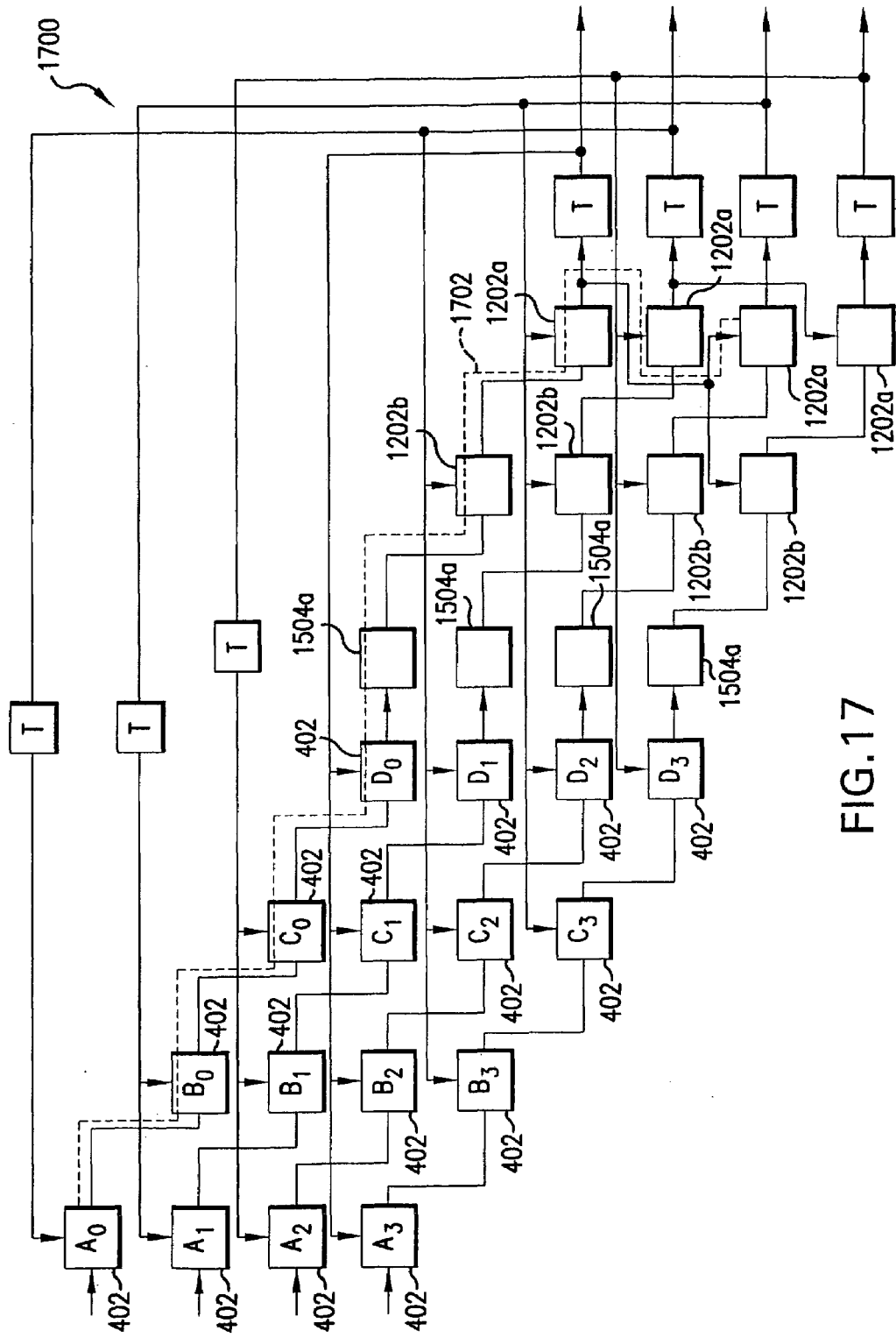
FIG. 17 illustrates a critical path of a 4-unfolded multiplexer loop based on the circuit of FIG. 16.

FIG. 17 illustrates a 4-unfolded circuit 1700 having a critical path 1702. Critical path 1702 is illustrated by a dashed line. As shown in FIG. 17, circuit 1700 is formed using circuit 1600. Circuit 1700 contains several 2-to-1 multiplexers 402 and several delays 404.

Critical path 1702 has eight 2-to-1 multiplexers. As described herein, the computation time of these 2-to-1 multiplexers is 2.0 ns (i.e., 6×0.2 ns+2×0.4 ns=2.0 ns). This computation time, however, does not meet the design requirement of 1.7 ns. Thus, in accordance with the invention, retiming is used to reduce computation time of the circuit.

Figure 18:
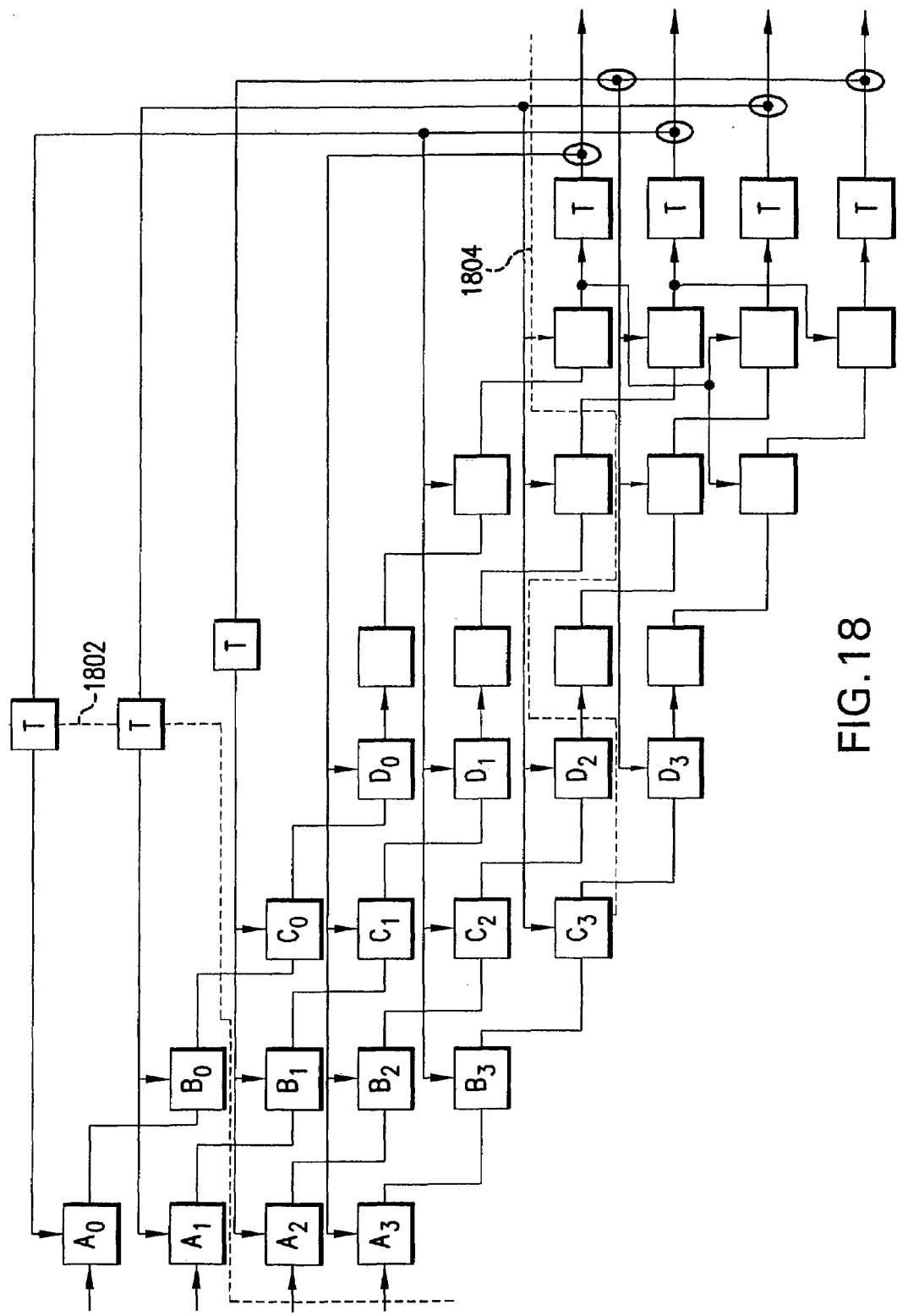
FIG. 18 illustrates two cut-sets that can be used to retime the circuit of FIG. 17.

FIG. 18 illustrates two cut-sets 1802, 1804 that can be used to reduce the number of 2-to-1 multiplexers in the critical path of the circuit of FIG. 17. This will reduce the computation time of the circuit.

Figure 19:
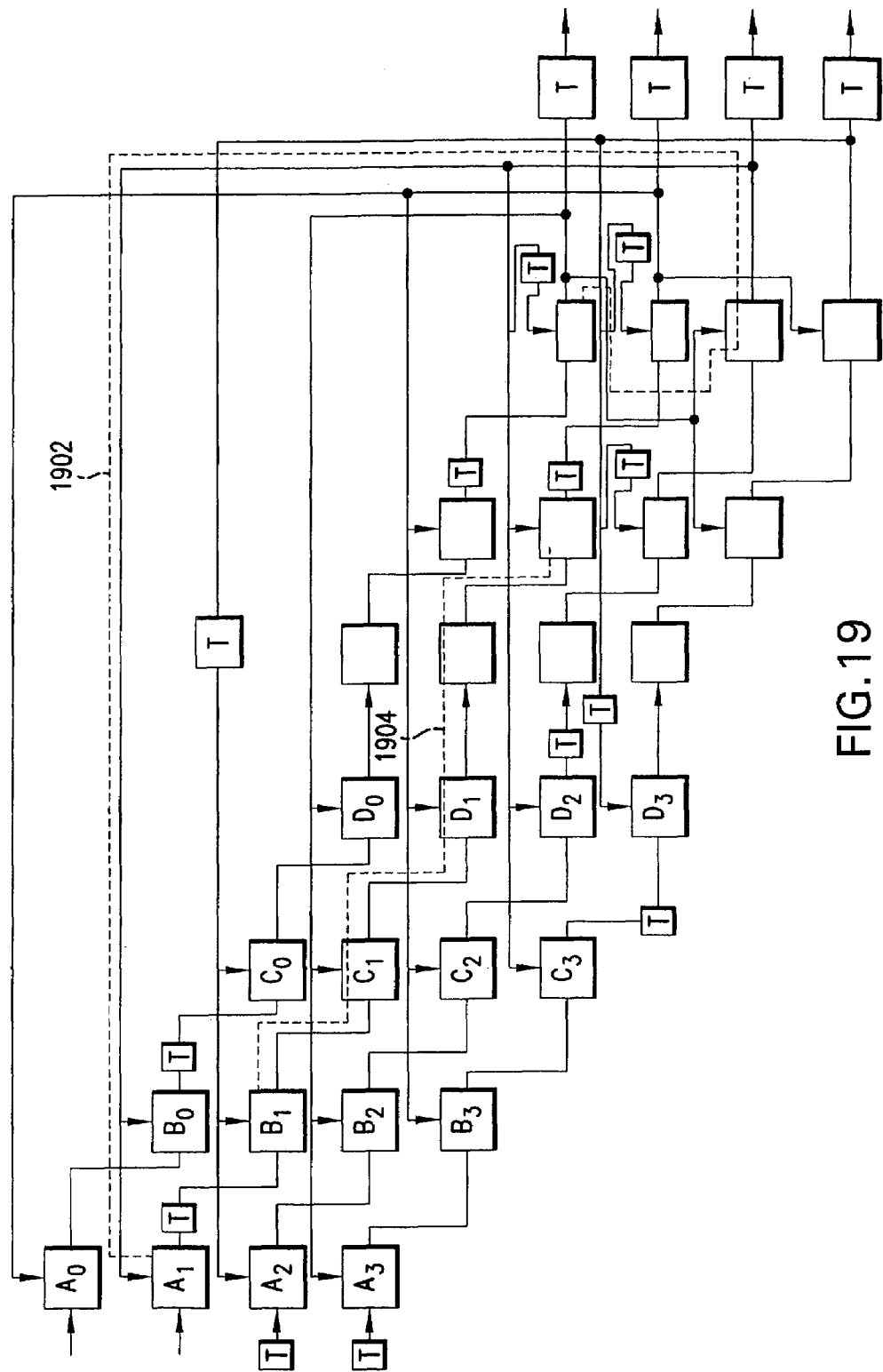
FIG. 19 illustrates the retimed circuit of FIG. 17.

FIG. 19 illustrates the retimed circuit of FIG. 16. This retimed circuit has two critical paths 1902, 1904. The computation time of critical path 1902 is 1.0 ns (i.e., 2×0.4 ns+1×0.2 ns=1.0 ns). The computation time of critical path 1904 is also 1.0 ns (i.e., 5×0.2 ns=1.0 ns). This is well below the required design criterion of 1.7 ns, and better than that which can be achieved when the invention is not used. By computing outputs and inverted outputs for the last stage of multiplexers, a clock period of operation of 1.2 ns can be achieved (i.e., 1.0 ns+0.2 ns).

As will become apparent to persons skilled in the relevant arts from the description that follows, the invention is not limited to a particular amount of look-ahead or a particular number of inputs-to-outputs, such as the 4-to-1 ratio illustrated in FIG. 15A.

Figure 20:
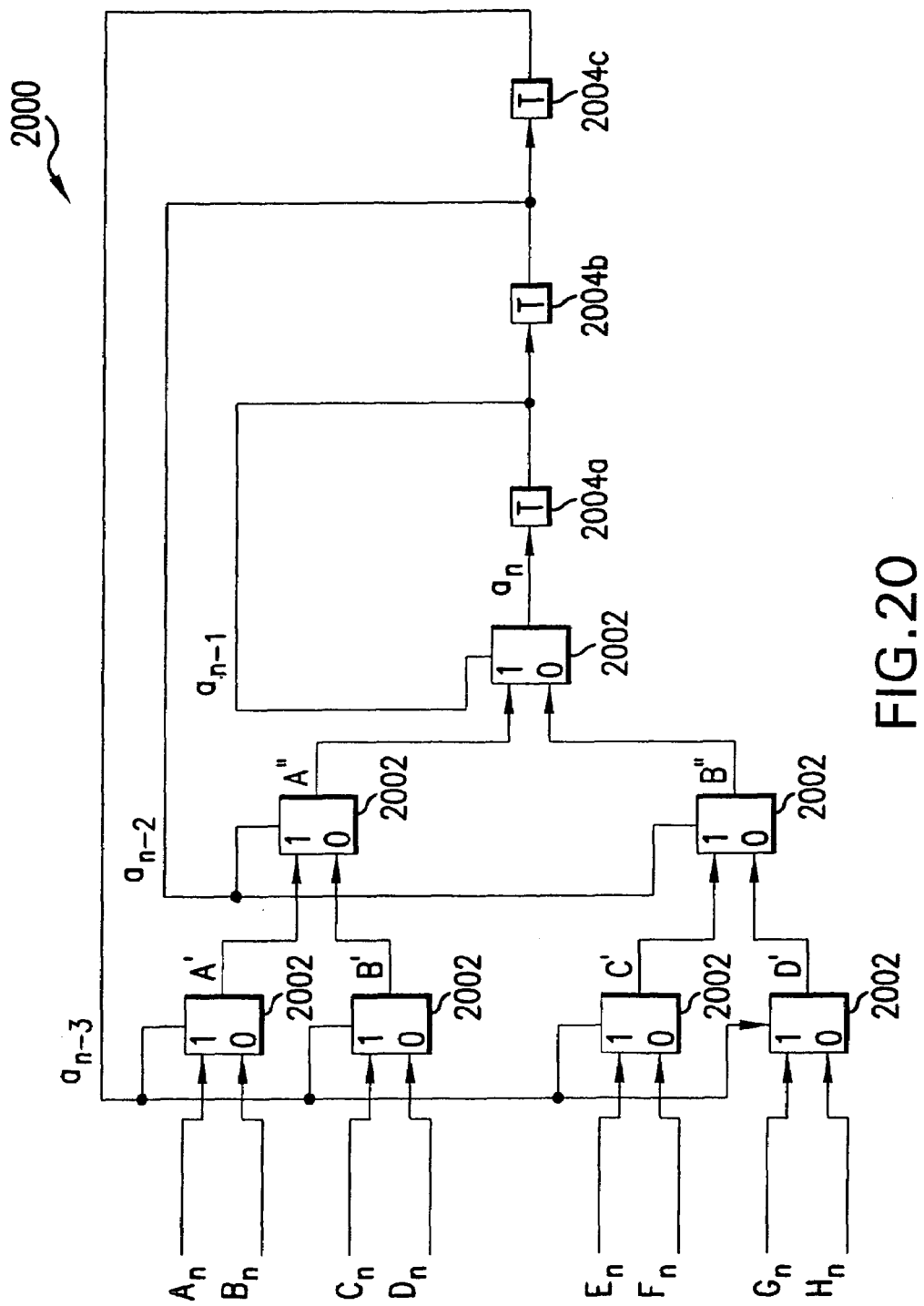
FIG. 20 illustrates an 8-to1 multiplexer loop.

FIG. 20 illustrates an 8-to-1 multiplexer loop 2000. Multiplexer loop 2000 is formed from a plurality of 2-to-1 multiplexers 2002 and a plurality of delays 2004, as shown in FIG. 20. The output of multiplexer loop 2000 is given by the following equations:

$$a(n) = A''(n)a(n-1) + B''(n)\overline{a}(n-1)$$

$$\overline{a}(n) = \overline{A}''(n)a(n-1) + \overline{B}''(n)\overline{a}(n-1)$$

$$A''(n) = A'(n)a(n-2) + B'(n)\overline{a}(n-2)$$

$$\overline{A}''(n) = \overline{A}'(n)a(n-2) + \overline{B}'(n)\overline{a}(n-2)$$

$$B''(n) = C'(n)a(n-2) + D'(n)\overline{a}(n-2)$$

$$\overline{B}''(n) = \overline{C}'(n)a(n-2) + \overline{D}'(n)\overline{a}(n-2)$$

$$A'(n) = A_n a(n-3) + B_n \overline{a}(n-3)$$

$$\overline{A}'(n) = \overline{A}_n a(n-3) + \overline{B}_n \overline{a}(n-3)$$

$$B'(n) = C_n a(n-3) + D_n \overline{a}(n-3)$$

$$\overline{B}'(n) = \overline{C}_n a(n-3) + \overline{D}_n \overline{a}(n-3)$$

$$C'(n) = E_n a(n-3) + F_n \overline{a}(n-3)$$

$$\overline{C}'(n) = \overline{E}_n a(n-3) + \overline{F}_n \overline{a}(n-3)$$

$$D'(n) = G_n a(n-3) + H_n \overline{a}(n-3)$$

$$\overline{D}'(n) = \overline{G}_n a(n-3) + \overline{H}_n \overline{a}(n-3)$$

Figure 21:
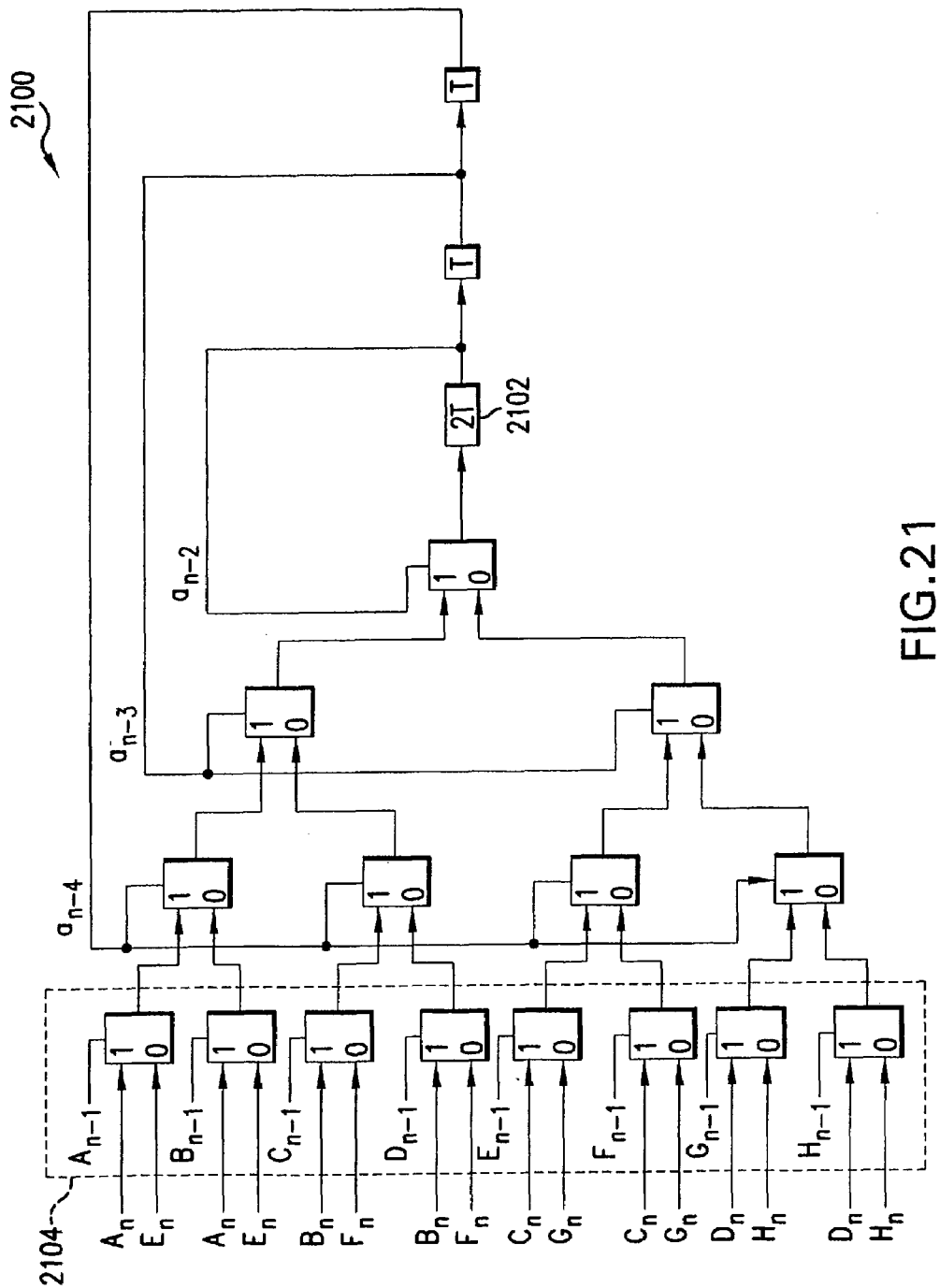
FIG. 21 illustrates a circuit formed by applying the look-ahead and pipelining techniques of the invention to the 8-to1 multiplexer loop of FIG. 20.

FIG. 21 illustrates a circuit 2100 formed by applying the look-ahead and pipelining of the invention to circuit 2000. As shown in FIG. 21, delay 2004a has been replaced by a delay 2102, and a look-ahead network 2104 has been added. The benefits of circuit 2100 over circuit 2000 are the same as those already described herein for other circuits according to the invention.

The output of circuit 2100 is described by the following equations:

$$a(n) = a(n-1)[a(n-2)\{a(n-3)A_n + \bar{a}(n-3)B_n\} +$$
$$\bar{a}(n-2)\{a(n-3)C_n + \bar{a}(n-3)D_n\}] +$$
$$\bar{a}(n-1)[(a(n-2)\{a(n-3)E_n + \bar{a}(n-3)F_n\} +$$
$$\bar{a}(n-2)\{a(n-3)G_n + \bar{a}(n-3)H_n\}]$$

$$\bar{a}(n) = a(n-1)[a(n-2)\{a(n-3)\bar{A}_n + \bar{a}(n-3)\bar{B}_n\} +$$
$$\bar{a}(n-2)\{a(n-3)\bar{C}_n + \bar{a}(n-3)\bar{D}_n\}] +$$
$$\bar{a}(n-1)[a(n-2)\{a(n-3)\bar{E}_n + \bar{a}(n-3)\bar{F}_n\} +$$
$$\bar{a}(n-2)\{a(n-3)\bar{G}_n + \bar{a}(n-3)\bar{H}_n\}]$$

$$a(n) = a(n-2)\{A_n a(n-3)\{a(n-4)A_{n-1} + \bar{a}(n-4)B_{n-1}\} +$$
$$B_n \bar{a}(n-3)\{a(n-4)C_{n-1} + \bar{a}(n-4)D_{n-1}\}\} +$$
$$\bar{a}(n-2)\{C_n a(n-3)\{a(n-4)E_{n-1} + \bar{a}(n-4)F_{n-1}\} +$$
$$D_n \bar{a}(n-3)\{a(n-4)G_{n-1} + \bar{a}(n-4)H_{n-1}\}\} +$$
$$a(n-2)\{E_n a(n-3)\{a(n-4)\bar{A}_{n-1} + \bar{a}(n-4)\bar{B}_{n-1}\} +$$
$$F_n \bar{a}(n-3)\{a(n-4)\bar{C}_{n-1} + \bar{a}(n-4)\bar{D}_{n-1}\}\} +$$
$$\bar{a}(n-2)\{G_n a(n-3)\{a(n-4)\bar{E}_{n-1} + a(n-4)\bar{F}_{n-1}\} +$$
$$H_n a(n-3)\{a(n-4)\bar{G}_{n-1} + a(n-4)\bar{H}_{n-1}\}\}$$

$$a(n) = [A_n(A_{n-1}a(n-4) + B_{n-1}\bar{a}(n-4))a(n-3) +$$
$$B_n(C_{n-1}a(n-4) + D_{n-1}\bar{a}(n-4))\bar{a}(n-3)]a(n-2) +$$
$$[C_n(E_{n-1}a(n-4) + F_{n-1}\bar{a}(n-4))a(n-3) +$$
$$D_n(G_{n-1}a(n-4) + H_{n-1}\bar{a}(n-4))\bar{a}(n-3)]\bar{a}(n-2) +$$
$$[E_n(\bar{A}_{n-1}a(n-4) + \bar{B}_{n-1}\bar{a}(n-4))a(n-3) +$$
$$F_n(\bar{C}_{n-1}a(n-4) + \bar{D}_{n-1}\bar{a}(n-4))\bar{a}(n-3)]a(n-2) +$$
$$G_n(\bar{E}_{n-1}a(n-4) + \bar{F}_{n-1}\bar{a}(n-4))a(n-3) +$$
$$H_n(\bar{G}_{n-1}a(n-4) + \bar{H}_{n-1}\bar{a}(n-4))\bar{a}(n-3)]\bar{a}(n-2)$$

$$a(n) = \begin{bmatrix} \{(A_nA_{n-1} + E_n\bar{A}_{n-1})a(n-4) + (A_nB_{n-1} + E_n\bar{B}_{n-1})\bar{a}(n-4)\}a(n-3) + \\ \{(B_nC_{n-1} + F_n\bar{C}_{n-1})a(n-4) + (B_nD_{n-1} + F_n\bar{D}_{n-1})\bar{a}(n-4)\}\bar{a}(n-3) \end{bmatrix} a(n-2) +$$

$$\begin{bmatrix} \{(C_nE_{n-1} + G_n\bar{E}_{n-1})a(n-4) + (C_nF_{n-1} + G_n\bar{F}_{n-1})\bar{a}(n-4)\}a(n-3) + \\ \{(D_nG_{n-1} + H_n\bar{G}_{n-1})a(n-4) + (D_nH_{n-1} + H_n\bar{H}_{n-1})\bar{a}(n-4)\}\bar{a}(n-3) \end{bmatrix} \bar{a}(n-2)$$

In order to further illustrate the invention, a method embodiment will now be described.

Figure 22:
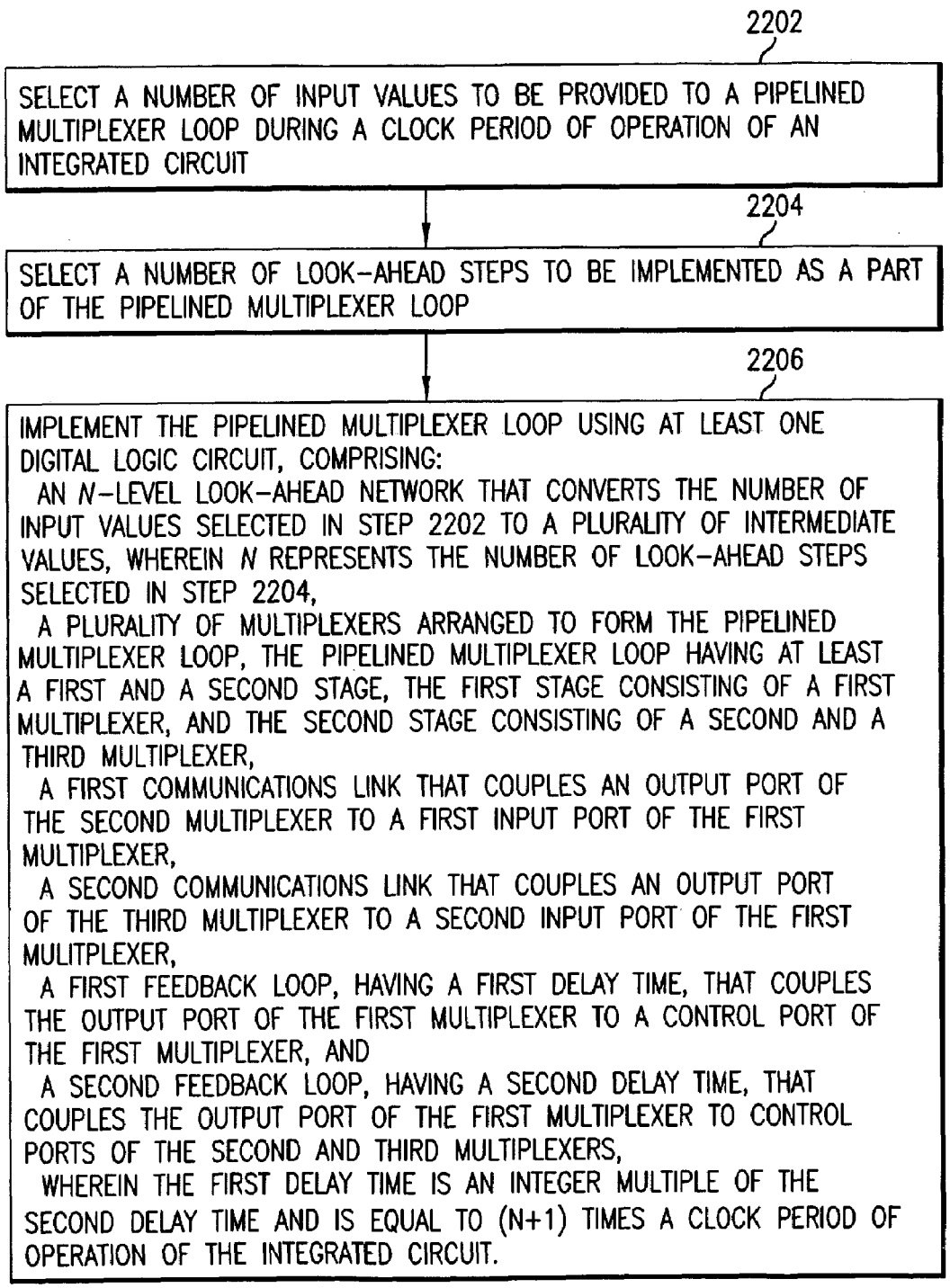
FIG. 22 illustrates a flowchart of the steps of a method for pipelining multiplexer loops that form part of an integrated circuit according to an embodiment of the invention.

FIG. 22 illustrates a flowchart of the steps of a method 2200 for pipelining multiplexer loops according to an embodiment invention. As described herein, pipelined multiplexer loops according to the invention can be used to form part of an integrated circuit.

Method 2200 has three steps 2202, 2204, 2206. Each of these steps will now be described and illustrated with an example application.

In step 2202, a number of input values is selected. The selected number of inputs is provided to a pipelined multiplexer loop according to the invention during a clock period of operation of an integrated circuit. The number of selected inputs can be used to identify a particular multiplexer loop that is to be modified in accordance with the invention.

In step 2204, a number of look-ahead steps is selected. The number of look-ahead steps is independent of the number of input values selected in step 2202. The selected level of look-ahead is implemented as a part of the pipelined multiplexer loop according to the invention.

In step 2206, a pipelined multiplexer loop according to the invention is implemented using, for example, a backplane or an optical/fiber technology. The pipelined multiplexer loop is implemented using at least one digital logic circuit according to the invention. The pipelined multiplexer is also implemented so that it has the number of look-ahead steps selected in step 2204.

As described herein, in an embodiment, the digital logic circuit according to the invention has an n-level look-ahead network that converts the number of input values selected in step 2202 to a plurality of intermediate values, wherein n represents the number of look-ahead steps selected in step 2204. The digital logic circuit is formed from a plurality of multiplexers each having a first and a second input port, an output port, and a control port. At least some of these multiplexers are arranged to form the pipelined multiplexer loop. The pipelined multiplexer loop has at least a first and a second stage. The first stage consists of a first multiplexer. The second stage consists of a second and a third multiplexer. A first communications link couples the output port of the second multiplexer to the first input port of the first multiplexer. A second communications link couples the output port of the third multiplexer to the second input port of the first multiplexer. A first feedback loop, having a first delay time, couples the output port of the first multiplexer to the control port of the first multiplexer. A second feedback loop, having a second delay time, couples the output port of the first multiplexer to the control ports of the second and third multiplexers. The first delay time is an integer multiple of the second delay time and is equal to (n+1) times a clock period of operation of the integrated circuit.

As described herein, method 2200 can be used to design or improve the performance of a wide variety of circuits. FIGS. 23–28 illustrate how method 2200 is applied to design and/or improve the performance of a DFE.

Figure 23:
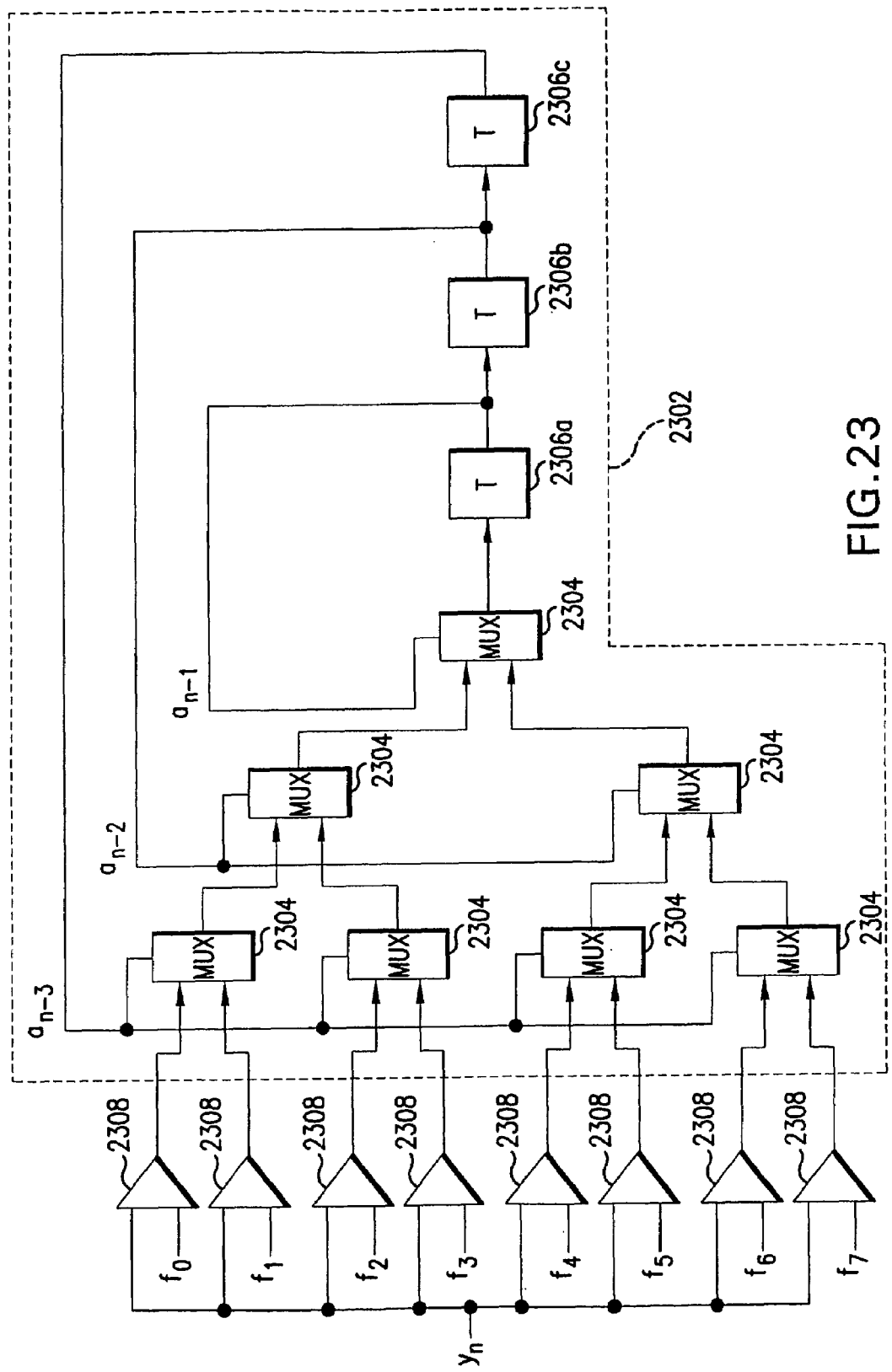
FIG. 23 illustrates a serial representation of a 3-tap decision feedback equalizer.

FIG. 23 illustrates a serial representation of an example of a circuit that can be used as part of a digital communications system to remove inter-symbol interference (i.e., a DFE). The DFE is formed using an 8-to-1 multiplexer loop 2302 (similar to the 8-to-1 multiplexer loop 2000 described above) and several comparators 2308. The multiplexers 2304 of the multiplexer loop are similar to those described above, each having an expected computation time of 0.2 ns. The multiplexer loop has three delays 2306a, 2306b, 2306c.

The DFE circuit of FIG. 23 can be determined after selecting, in step 2202 of method 2200, the number of input values that to be provided to a pipelined multiplexer loop during a clock period of operation of an integrated circuit. As shown in FIG. 23., eight values are input to multiplexer loop 2302. These input values are the outputs of the eight comparators 2308. The comparators 2308 compare an input signal $y_n$ to eight possible feedback signals $f_0 \ldots f_7$. The eight feedback signals are given by the following equations:

$$f_0 = -c_3 - c_2 - c_1$$
$$f_1 = -c_3 - c_2 + c_1$$
$$f_2 = -c_3 + c_2 - c_1$$
$$f_3 = -c_3 + c_2 + c_1$$
$$f_4 = +c_3 - c_2 - c_1$$
$$f_5 = +c_3 - c_2 + c_1$$
$$f_6 = +c_3 + c_2 - c_1$$
$$f_7 = +c_3 + c_2 + c_1$$

where $c_3$, $c_2$, and $c_1$ are the three tap coefficients of the DFE. As described above, the present invention can be applied to multiplexer loop 2302.

Figure 24:
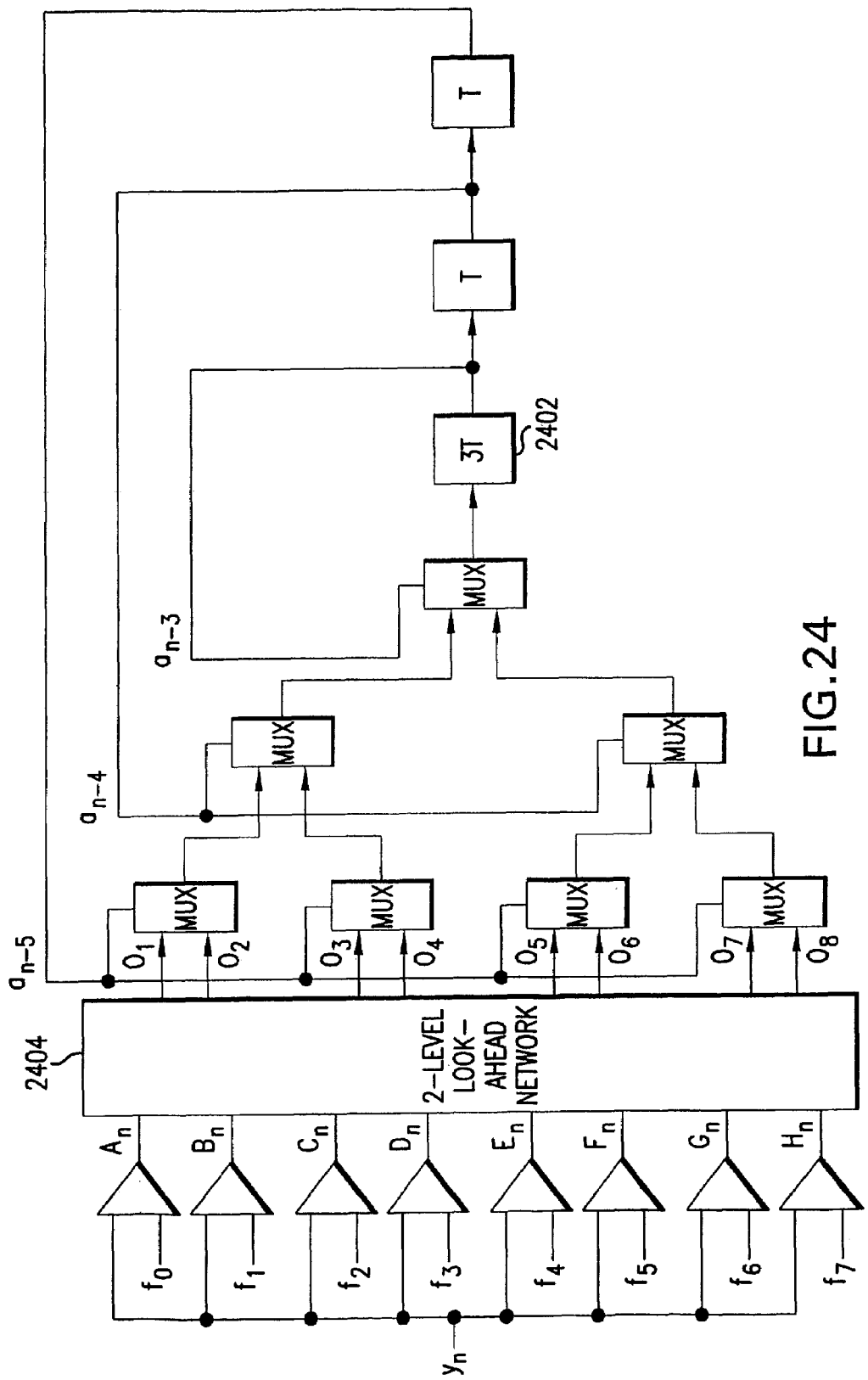
FIG. 24 illustrates a serial representation of a 3-tap decision feedback equalizer having 2-levels of look-ahead according to the invention.

FIG. 24 illustrates an embodiment of the 3-tap DFE of FIG. 23 having pipelining and 2-levels of look-ahead in accordance with the invention. The circuit of FIG. 24 can be formed from the circuit of FIG. 23 by replacing delay 2306a with a delay 2402, and by adding 2-level look-ahead network 2404.

As can be seen in FIG. 24, the delay 2402 forms a part of every loop of the multiplexer loop. In addition, it can be seen that no additional multiplexers were added to the loops of the multiplexer loop. Furthermore, 2-level look-ahead network 2404 has been placed before each of the multiplexers that form part of the multiplexer loop shown in FIG. 23.

Figure 25:
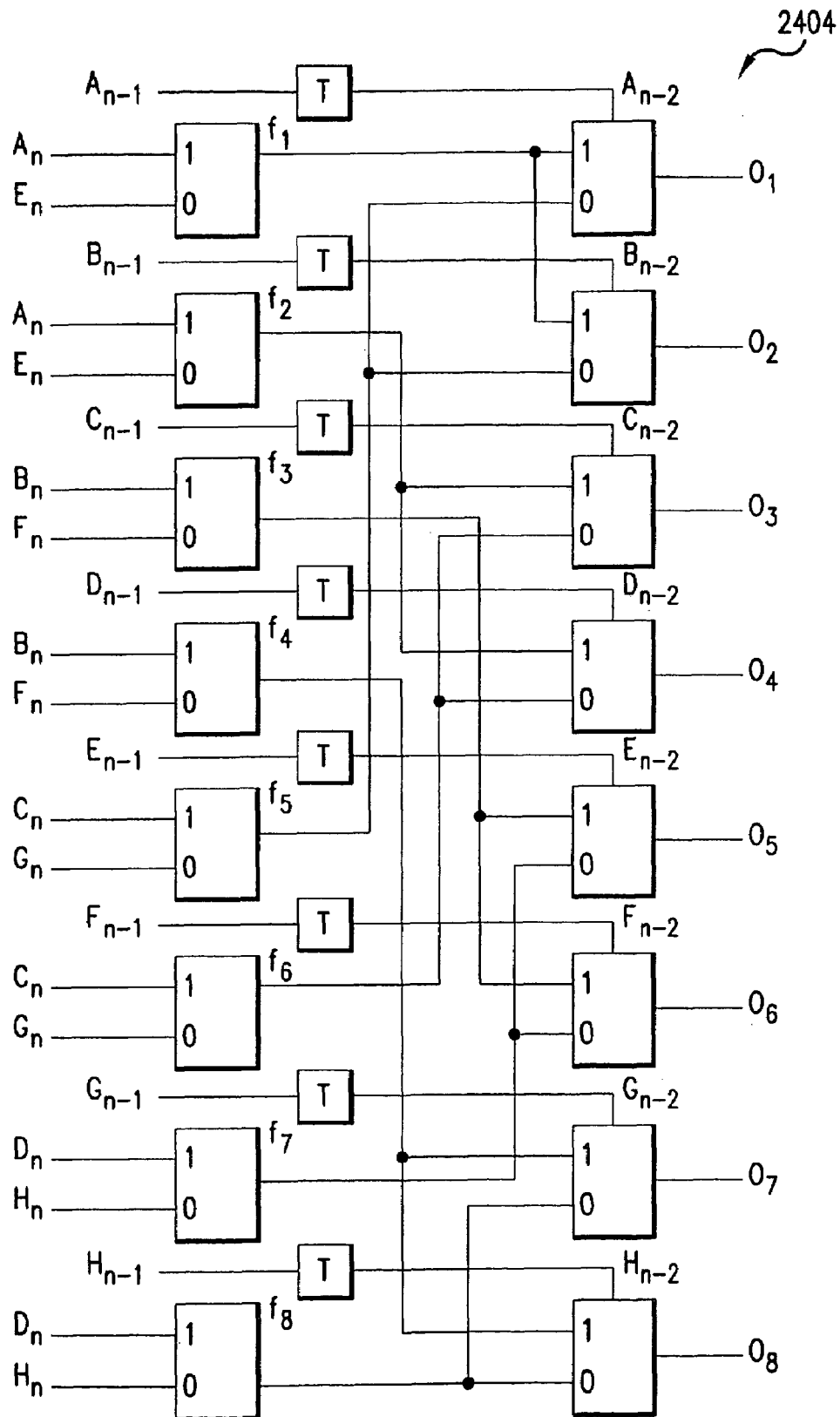
FIG. 25 illustrates a 2-level look-ahead network according to an embodiment of the invention.

FIG. 25 illustrates a detailed view of 2-level look-ahead network 2404. As shown in FIG. 25, 2-level look-ahead network 2404 is formed using multiplexers and delays. 2-level look-ahead network 2404 transforms eight input values $A_n$, $B_n$, $C_n$, $D_n$, $E_n$, $F_n$, $G_n$, and $H_n$, into eight intermediate values $O_1$, $O_2$, $O_3$, $O_4$, $O_5$, $O_6$, $O_7$, and $O_8$. As will be understood by persons skilled in the relevant arts, other circuits can be used to implement a 2-level look-ahead network.

As described herein, circuit according to the invention can be used to form part of a larger integrated circuit. In embodiments of the invention, circuits according to the invention are combined with comparator circuits to form an integrated circuit.

Figure 26:
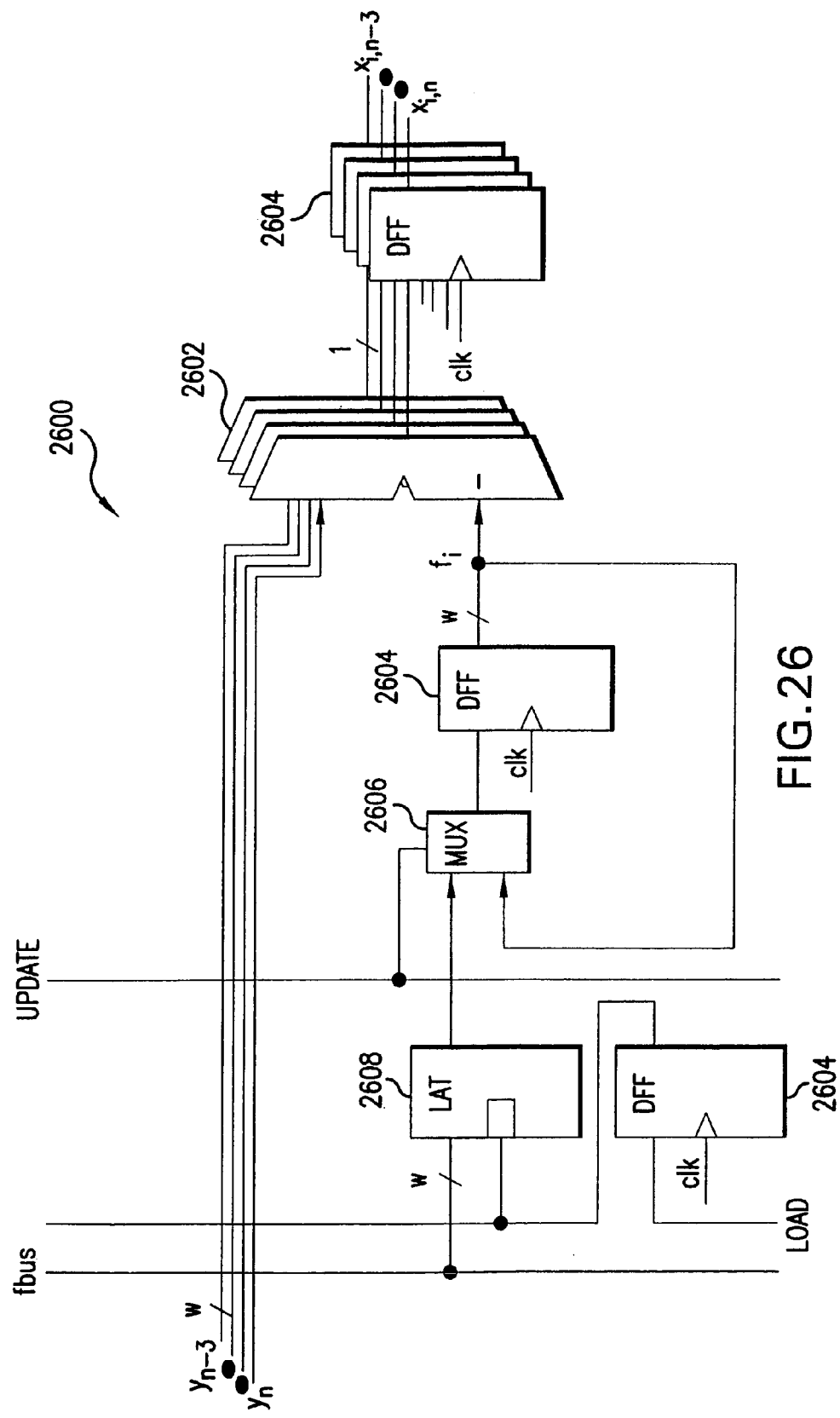
FIG. 26 illustrates a 4-unfolded comparator circuit with $f_1$-latch and pipeline-registers.

FIG. 26 illustrates a 4-unfolded comparator circuit 2600 with $f_1$-latch and pipeline-registers. Circuit 2600 is formed using comparators 2602, data flip-flops (DFF) 2604, and latches (LAT) 2608. Circuit 2600 can be used, for example, with a 4-unfolded and retimed circuit formed from the circuit of FIG. 24. The circuit of FIG. 24 can be unfolded and retimed in a manner similar to that described above for the circuit of FIG. 16.

Figure 27:
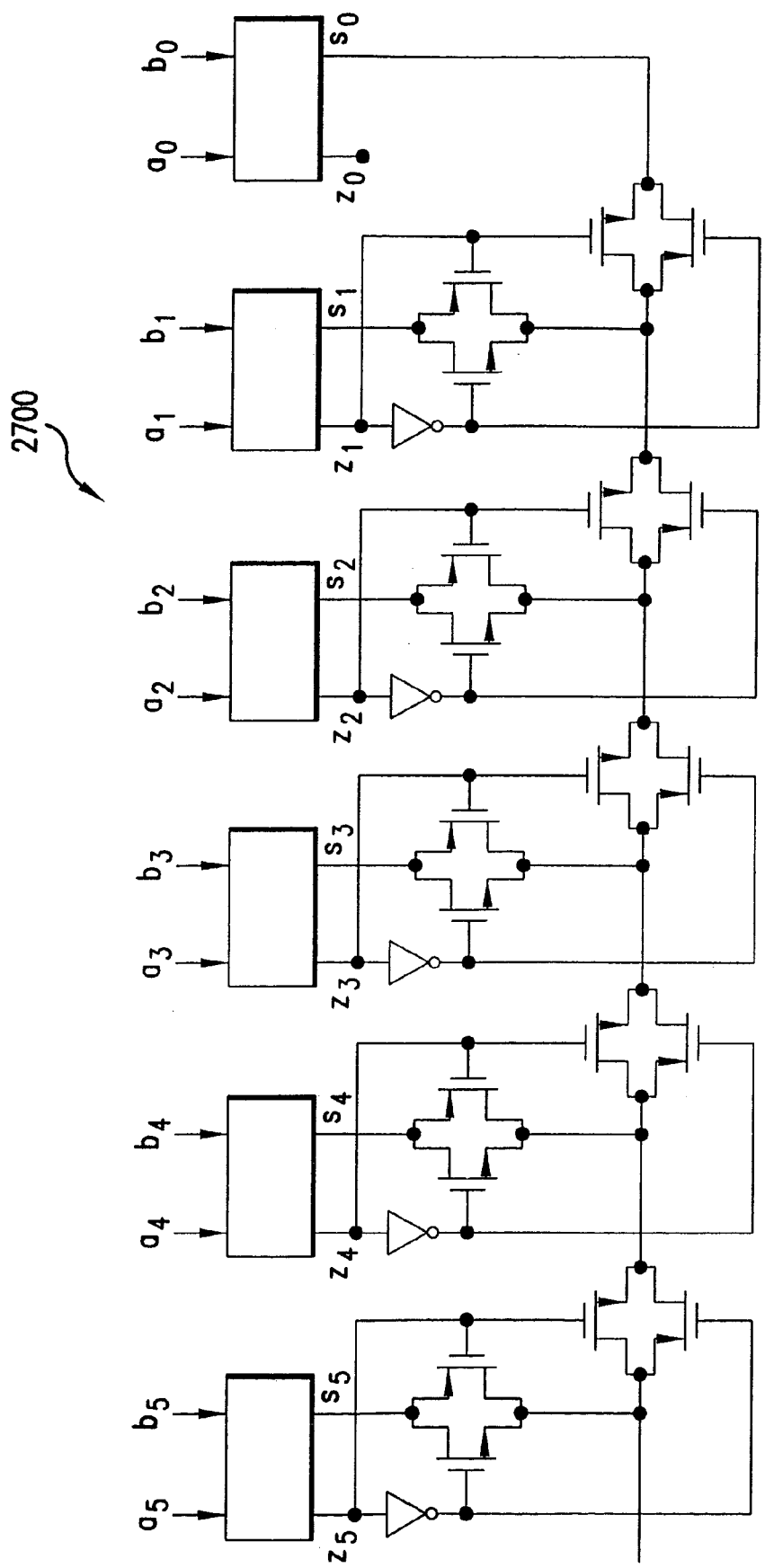
FIG. 27 illustrates a 6-bit compare circuit.

FIG. 27 illustrates a 6-bit compare circuit 2700. Circuit 2700 can be modified, when required, to form an n-bit compare circuit. The operation of circuit 2700 is described by the following equations:

$$z_i = \overline{a_i \oplus b_i} \text{ if } a_i = b_i$$
$$s_i = a_i \overline{b_i} \quad s_5 = \overline{a}_5 b_5$$
$$s_i = 1 \Rightarrow a_i > b_i$$

Figure 28:
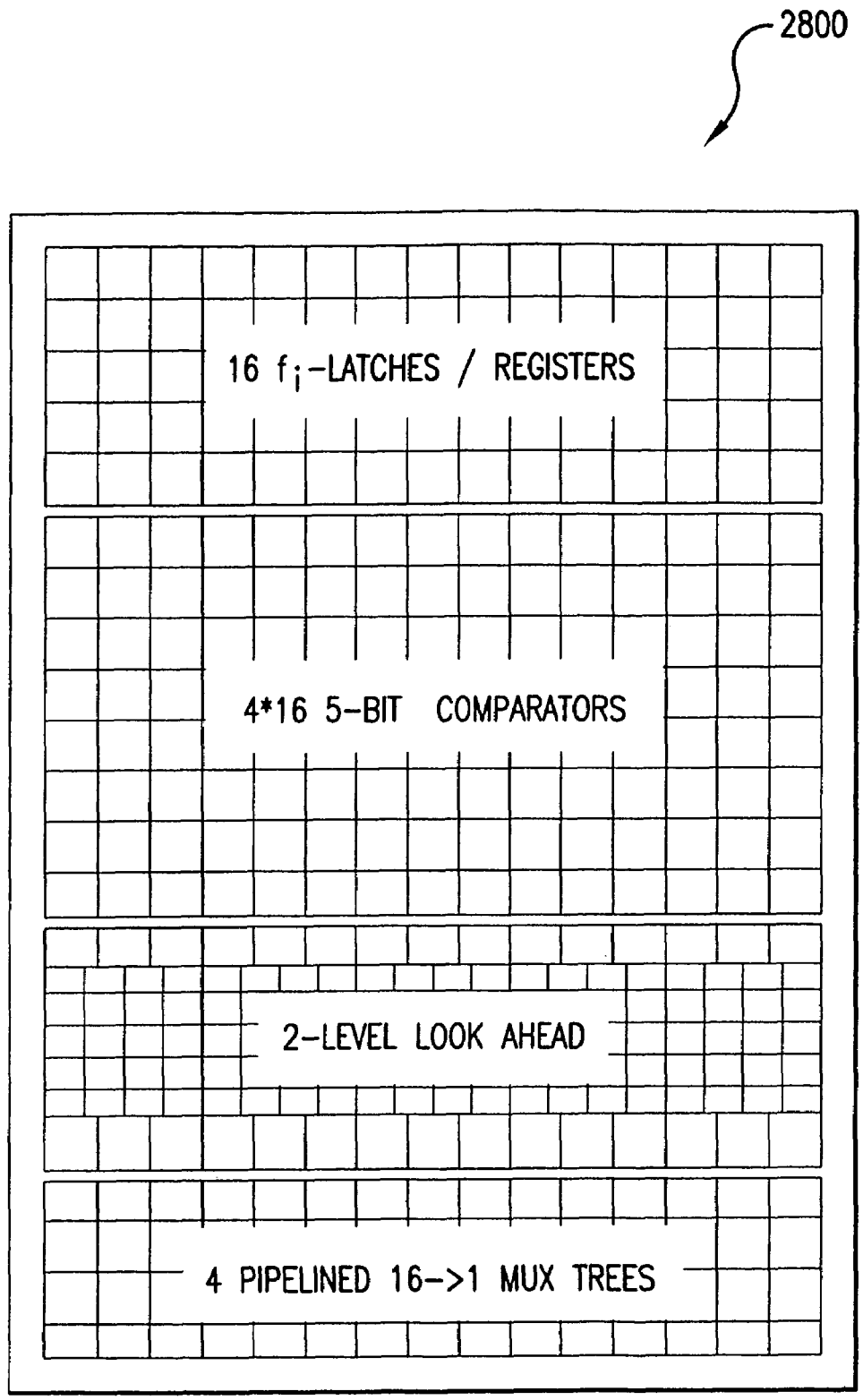
FIG. 28 illustrates a serializer/deserializer 4-tap decision feedback equalizer integrated circuit according to an embodiment of the invention.

FIG. 28 illustrates a serializer/deserializer that makes use of a 4-tap decision feedback equalizer integrated circuit 2800 according to an embodiment of the invention. Circuit 2800 is implemented using circuits similar to those described herein. Integrated circuit 2800 is illustrative and not intended to limit the invention.

As will be understood by persons skilled in the relevant arts given the description herein, circuits having additional unfolding such as, for example, 8-unfolded circuits or 16-unfolded circuits can also be implemented in accordance with the invention. These circuits exhibit the features of the invention and enable high data rate digital communications systems to be built. Using the invention and various degrees of unfolding, it is possible to build circuits according to the invention that operate, for example, at data rates in excess of 3 Gb/s, 5 Gb/s, and 10 Gb/s.

As described herein, the invention can be used in a wide variety of digital circuits to improve performance. For example, in embodiments, the invention is used to improve the performance of computer processing systems having one or more nested feedback loops or multiplexer loops. Computer processing systems typically include microprocessors or microcontrollers having one or more instruction decoders, arithmetic logic units and/or other specialized circuits that contain multiplexers in a feedback loop. These feedback loops limit operating speed or processing speed. As described herein, the invention can be used to improve the operating speed or processing speed of such circuits, and thereby improve system performance. Other types of digital circuits that can benefit from the invention will become apparent to persons skilled in the relevant arts given the description herein.

CONCLUSION

Various embodiments of the present invention have been described above, which are independent of the size of the multiplexer loop and/or steps of look-ahead used. These various embodiments can be implemented, for example, in optical/fiber, backplane, twisted-pair, and coaxial cable transceivers. These various embodiments can also be implemented in systems other than communications systems. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A digital logic circuit for determining an output value based on a plurality of inputs values, comprising:
    an n-level look-ahead network that converts the plurality of input values to a plurality of intermediate values, wherein n is an integer greater than zero;
    a plurality of multiplexers each having a first and a second input port, an output port, and a control port, the plurality of multiplexers arranged to form a pipelined multiplexer loop having at least a first and a second stage, the first stage consisting of a first multiplexer, and the second stage consisting of a second and a third multiplexer, the pipelined multiplexer loop being coupled to the n-level look-ahead network;
    a first communications link that couples the output port of the second multiplexer to the first input port of the first multiplexer;
    a second communications link that couples the output port of the third multiplexer to the second input port of the first multiplexer;
    a first feedback loop that couples the output port of the first multiplexer to the control port of the first multiplexer, the first feedback loop comprising a first delay device having a first delay time; and
    a second feedback loop that couples the output port of the first multiplexer to the control ports of the second and third multiplexers, the second feedback loop comprising the first delay device and a second delay device having a second delay time,
    wherein the first delay time is an integer multiple of the second delay time and is equal to (n +1) times a clock period of operation of the digital logic circuit.

2. The digital logic circuit of claim 1, wherein the n-level look-ahead network is a 2-level look-ahead network.

3. The digital logic circuit of claim 1, wherein each of the plurality of multiplexers is a 2-to-1 multiplexer.

4. The digital logic circuit of claim 1, wherein the digital logic circuit forms part of a computer processing system.

5. The digital logic circuit of claim 1, wherein the digital logic circuit forms part of a transceiver.

6. The digital logic circuit of claim 1, wherein the first delay time is nominally two times longer than the second delay time.

7. The digital logic circuit of claim 1, wherein the first delay device and the second delay device each comprise at least one data flip-flop.

8. The digital logic circuit of claim 1, wherein the digital logic circuit forms part of a communications system operating at a data rate of at least 3 gigabits per second.

9. The digital logic circuit of claim 1, wherein the digital logic circuit forms part of a decision feedback equalizer.

10. A digital logic circuit for determining an output value based on a plurality of inputs values, comprising:
    an n-level look-ahead network that converts the plurality of input values to a plurality of intermediate values, wherein n is an integer greater than zero;
    a plurality of multiplexers each having a first and a second input port, an output port, and a control port, the plurality of multiplexers arranged to form a pipelined multiplexer loop, the pipelined multiplexer loop being coupled to the n-level look-ahead network;
    a first communications link that couples the output port of a first multiplexer to the first input port of a second multiplexer;
    a second communications link that couples the output port of a third multiplexer to the second input port of the second multiplexer;
    a first feedback loop that couples the output port of the second multiplexer to the control port of the second multiplexer, the first feedback loop comprising a first delay device having a first delay time; and
    a second feedback loop that couples the output port of the second multiplexer to the control ports of the first and third multiplexers, the second feedback loop comprising the first delay device and a second delay device having a second delay time,
    wherein the first delay time is an integer multiple of the second delay time and is equal to (n +1) times a clock period of operation of the digital logic circuit.

11. The digital logic circuit of claim 10, wherein the digital logic circuit forms part of a transceiver.

12. The digital logic circuit of claim 10, wherein the digital logic circuit forms part of a computer processing system.

13. The digital logic circuit of claim 10, wherein the first delay device and the second delay device each comprise at least one data flip-flop.

14. The digital logic circuit of claim 10, wherein the digital logic circuit forms part of a communications system operating at a data rate of at least 3 gigabits per second.

15. The digital logic circuit of claim 10, wherein the digital logic circuit forms part of a decision feedback equalizer.

16. A method for pipelining multiplexer loops that form part of an integrated circuit, the method comprising the steps of:
    (a) selecting a number of input values to be provided to a pipelined multiplexer loop during a clock period of operation of the integrated circuit;
    (b) selecting a number of look-ahead steps to be implemented as a part of the pipelined multiplexer loop; and
    (c) implementing the pipelined multiplexer loop using at least one digital logic circuit by
        providing an n-level look-ahead network that converts the number of input values selected in step (a) to a plurality of intermediate values, wherein n is an integer greater than zero and represents the number of look-ahead steps selected in step,
        providing a plurality of multiplexers each having a first and a second input port, an output port, and a control port, the plurality of multiplexers arranged to form the pipelined multiplexer loop, the pipelined multiplexer loop having at least a first and a second stage, the first stage consisting of a first multiplexer, and the second stage consisting of a second and a third multiplexer, the pipelined multiplexer loop being coupled to the n-level look-ahead network, providing a first communications link that couples the output port of the second multiplexer to the first input port of the first multiplexer, providing a second communications link that couples the output port of the third multiplexer to the second input port of the first multiplexer, providing a first feedback loop, having a first delay time, that couples the output port of the first multiplexer to the control port of the first multiplexer, and providing a second feedback loop, having a second delay time, that couples the output port of the first multiplexer to the control ports of the second and third multiplexers, wherein the first delay time is an integer multiple of the second delay time and is equal to (n+1) times a clock period of operation of the integrated circuit.

17. The method of claim 16, wherein step (c) further comprising the step of:

implementing the pipelined multiplexer loop of the at least one digital logic circuit in a communications system.

18. The method of claim 16, wherein step (c) further comprising the step of:

implementing the pipelined multiplexer loop of the at least one digital logic circuit in a computer processing system.

19. The method of claim 16, further comprising the step of:

operating the pipelined multiplexer loop of the at least one digital logic circuit at a rate sufficient to process data at a rate equal to at least 3 gigabits per second.

20. The method of claim 16, further comprising the step of:

redistributing the first time delay and the second time delay using retiming techniques.

* * * * *

UNITED STATES PATENT AND TRADEMARK OFFICE
CERTIFICATE OF CORRECTION

PATENT NO. : 7,239,652 B2 Page 1 of 1
APPLICATION NO. : 10/055910
DATED : July 3, 2007
INVENTOR(S) : Keshab K. Parhi It is certified that error appears in the above-identified patent and that said Letters Patent is hereby corrected as shown below:

Column 15
Line 23, "inputs" is replaced with --input--.

Column 16
Line 62, "step," is replace with --step (b),--.

Column 17
Line 22, "comprising" is replaced with --comprises--.

Column 18
Line 5, "comprising" is replaced with --comprises--.

Signed and Sealed this

Twenty-fifth Day of March, 2008

JON W. DUDAS
*Director of the United States Patent and Trademark Office*